(12) United States Patent
Saboune et al.

(10) Patent No.: US 10,613,636 B2
(45) Date of Patent: Apr. 7, 2020

(54) HAPTIC PLAYBACK ADJUSTMENT SYSTEM

(71) Applicant: Immersion Corporation, San Jose, CA (US)

(72) Inventors: Jamal Saboune, Montreal (CA); Stephen Rank, San Jose, CA (US); Amer Alhalabi, Laval (CA); Shadi Asfour, Montreal (CA); Changyu Yang, Lasalle (CA)

(73) Assignee: Immersion Corporation, San Jose, CA (US)

(*) Notice: Subject to any disclaimer, the term of this patent is extended or adjusted under 35 U.S.C. 154(b) by 0 days.

(21) Appl. No.: 16/298,128

(22) Filed: Mar. 11, 2019

(65) Prior Publication Data

US 2019/0272035 A1 Sep. 5, 2019

Related U.S. Application Data

(63) Continuation of application No. 14/886,307, filed on Oct. 19, 2015, now Pat. No. 10,261,582.

(60) Provisional application No. 62/153,576, filed on Apr. 28, 2015.

(51) Int. Cl.
| | | |
|---|---|---|
| *G09G 5/00* | (2006.01) | |
| *G06F 3/01* | (2006.01) | |
| *G06F 3/041* | (2006.01) | |

(52) U.S. Cl.
CPC .............. *G06F 3/016* (2013.01); *G06F 3/041* (2013.01); *G06F 2203/014* (2013.01)

(58) Field of Classification Search
CPC ...... G06F 3/016; G06F 3/041; G06F 3/04847; G08B 6/00; H04N 21/4325

USPC ................................ 345/173, 177; 340/407.1
See application file for complete search history.

(56) References Cited

U.S. PATENT DOCUMENTS

| | | | |
|---|---|---|---|
| 9,367,136 | B2 | 6/2016 | Latta et al. |
| 9,370,459 | B2 | 6/2016 | Mahoney |
| 9,370,704 | B2 | 6/2016 | Marty |
| 9,392,094 | B2 | 7/2016 | Hunt et al. |
| 9,462,262 | B1 | 10/2016 | Worley, III et al. |
| 9,626,805 | B2 | 4/2017 | Lampotang et al. |
| 9,645,646 | B2 | 5/2017 | Cowley et al. |
| 9,652,037 | B2 | 5/2017 | Rubin et al. |
| 9,760,166 | B2 | 9/2017 | Ammi et al. |
| 9,811,854 | B2 | 11/2017 | Lucido |

(Continued)

FOREIGN PATENT DOCUMENTS

| | | |
|---|---|---|
| EP | 2806352 A1 | 11/2014 |
| JP | 2005506614 A | 3/2005 |

(Continued)

OTHER PUBLICATIONS

Any information that are not included with this Information Disclosure Statement can be found in U.S. Appl. No. 14/886,307.

*Primary Examiner* — Jennifer T Nguyen
(74) *Attorney, Agent, or Firm* — Medler Ferro Woodhouse & Mills

(57) ABSTRACT

A method is provided for adjusting the playback rate of haptic effects to a desired playback rate. A desired playback rate is determined. A portion of a haptic signal based on the desired playback rate is generated. The portion of the haptic signal is sent to a haptic output device, causing the haptic output device to output haptic effects at a playback rate corresponding to the desired playback rate.

20 Claims, 22 Drawing Sheets

(56) References Cited

U.S. PATENT DOCUMENTS

| | | |
|---|---|---|
| 9,851,799 B2 | 12/2017 | Keller et al. |
| 9,933,851 B2 | 4/2018 | Goslin et al. |
| 9,948,885 B2 | 4/2018 | Kurzweil |
| 10,261,582 B2 * | 4/2019 | Saboune ............ G06F 3/041 |
| 2003/0068053 A1 * | 4/2003 | Chu .................. G06F 3/016 381/118 |
| 2009/0231271 A1 | 9/2009 | Heubel et al. |
| 2011/0061017 A1 | 3/2011 | Ullrich et al. |
| 2014/0089791 A1 | 3/2014 | Ishimaru |
| 2015/0154966 A1 | 6/2015 | Bharitkar et al. |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

FOREIGN PATENT DOCUMENTS

| | | |
|---|---|---|
| JP | 2009513077 A | 3/2009 |
| JP | 201015551 A | 1/2010 |
| JP | 2015185137 A | 10/2015 |
| WO | 2007047960 A2 | 4/2007 |

\* cited by examiner

HAPTIC PLAYBACK ADJUSTMENT SYSTEM

CROSS REFERENCE TO RELATED APPLICATIONS

This application is a continuation of U.S. patent application Ser. No. 14/886,307, filed on Oct. 19, 2015, which claims the benefit of U.S. Provisional Patent Application Ser. No. 62/153,576, filed on Apr. 28, 2015, both of which have been incorporated herein by reference in their entirety.

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic feedback" or "haptic effects"), such as forces, vibrations, and motions, to the user. Devices, such as mobile devices, touchscreen devices, personal computers, and wearable devices can be configured to generate haptic effects. In general, calls to embedded hardware capable of generating haptic effects (such as actuators) can be programmed within the device. These calls specify which haptic effect to play. For example, when a user interacts with the device using, for example, a button, touchscreen, lever, joystick, wheel, or some other control, the device can send a play command through control circuitry to the embedded hardware. The embedded hardware then produces the appropriate haptic effect.

When a haptic effect is authored by a haptic designer, the haptic effect can be authored under an assumption that a playback of the haptic effect occurs at a specific playback speed or rate. However, based on the device, the playback of the haptic effect can occur at a different playback rate. The playback of the haptic effect at a different playback rate can distort an end user's experience of the haptic effect. Further, the playback of the haptic effect may be synchronized with the playback of another type of input, such as audio input, video input, acceleration input, etc. If the playback rate of the other input is adjusted so that the playback rate of the other input does not match the playback rate of the haptic effect, the playback of the haptic effect may no longer be synchronized with the playback of the other input, which can further distort the end user's experience.

SUMMARY

One embodiment includes a method of adjusting the playback of haptic effects. A desired playback rate is determined. A portion of a haptic signal based on the desired playback rate is generated. The portion of the haptic signal is sent to a haptic output device, causing the haptic output device to output haptic effects at a playback rate corresponding to the desired playback rate.

BRIEF DESCRIPTION OF THE DRAWINGS

Further embodiments, details, advantages, and modifications will become apparent from the following detailed description of the example embodiments, which is to be taken in conjunction with the accompanying drawings.

DETAILED DESCRIPTION

Figure 1:
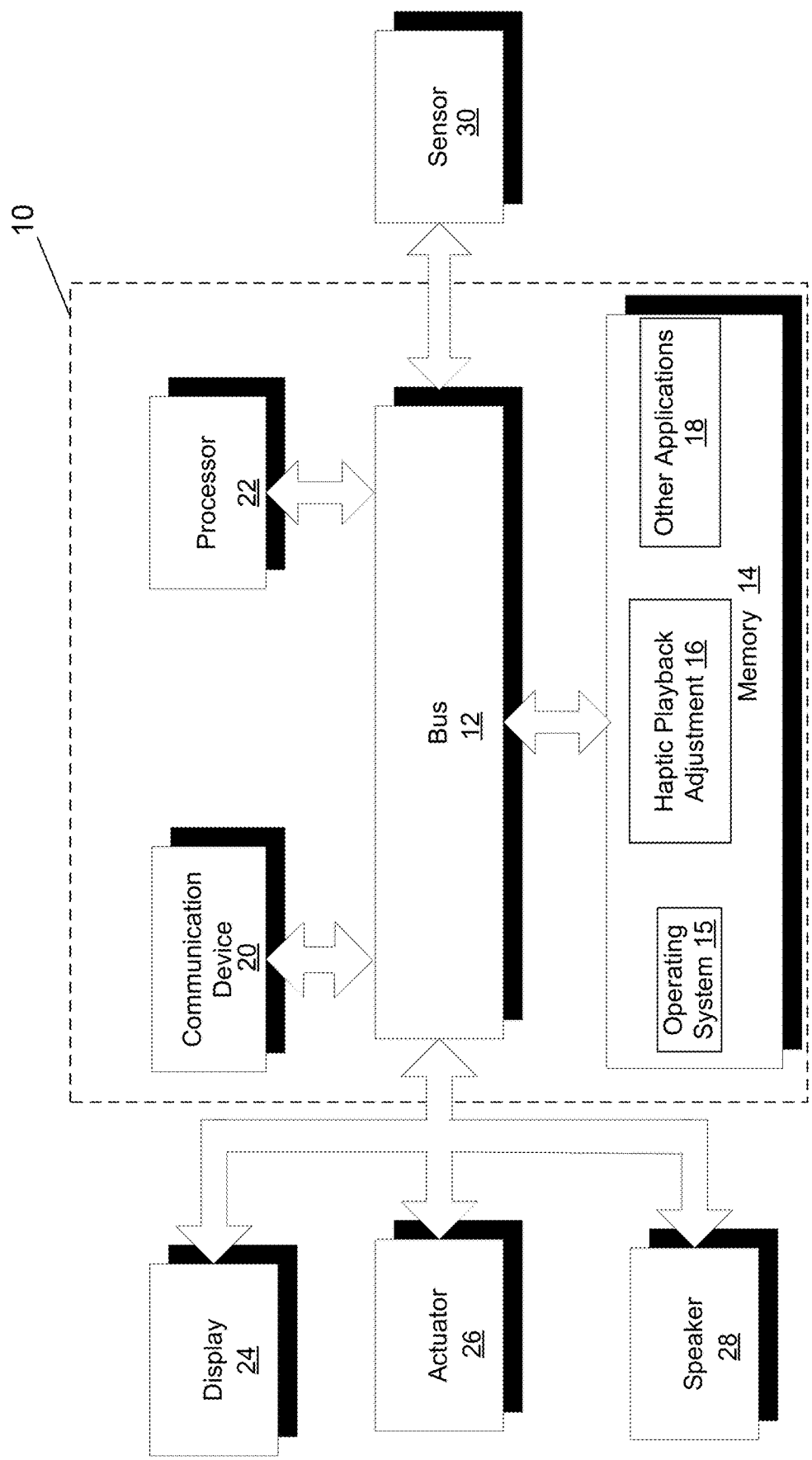
FIG. 1 illustrates a block diagram of a system in accordance with one embodiment of the invention.

One embodiment is a haptic playback adjustment system that adjusts a playback of haptic data, such as a haptic signal, to correspond to a desired playback rate, where a playback of the haptic data can correspond to different playback rates, or speeds.

In one embodiment, the haptic playback adjustment system can statically adjust a playback of a haptic signal. In other words, the haptic playback adjustment system can adjust a playback of a haptic signal to correspond to a desired playback rate, before a playback of the haptic signal is initiated. The haptic playback adjustment system can adjust the playback of the haptic signal to correspond to the desired playback rate using one or more static adjustment techniques that are further described below in greater detail. The haptic signal can subsequently be sent to a haptic output device, where the haptic signal causes the haptic output device to output one or more haptic effects, and where a playback of the one or more haptic effects corresponds to the desired playback rate.

For example, a user can take a video on a video capture device, such as a smartphone or action camera, at a high frame rate of 240 frames per second ("fps"). A haptic signal can be created using a haptic authoring tool, the video, accompanying audio, and/or other input sensor data. A user may wish to slow down the video, i.e., play the video in slow motion, to better perceive a fast-action sequence. For example, the user may want to play the video at ¼ speed. The user can select to play the video at 60 fps. In other words, a frame that was captured in ¹⁄₂₄₀th of a second (0.004167 sec.) will now be played at ¹⁄₆₀th of a second (0.0167), resulting in a playback speed that is four times slower than originally captured. The haptic playback adjustment system as described herein can also adjust the haptic signal to provide a haptic signal appropriate for the new playback speed.

In another embodiment, the haptic playback adjustment system can dynamically adjust a playback of a haptic signal. In other words, the haptic playback adjustment system can adjust a playback of a haptic signal to correspond to a desired playback rate, after a playback of the haptic signal is initiated. The haptic playback adjustment system can adjust the playback of the haptic signal to correspond to the desired playback rate using one or more dynamic adjustment techniques that are further described below in greater detail. The haptic signal can subsequently be sent to a haptic output device, where the haptic signal causes the haptic output device to output one or more haptic effects, and where a playback of the one or more haptic effects corresponds to the desired playback rate.

For example, a user can receive an animation on the user's mobile device that has haptic effect associated with parts of the animation. Depending on the capabilities of the device, the animation may play slower or faster than originally designed. Accordingly, the associated haptic effects may not coincide with the animation as intended as it plays. Suppose the animation plays slower than originally intended. A haptic effect may trigger prior to an animation element, resulting in a poor user experience. Suppose the animation plays faster than originally intended. A haptic effect may trigger later than the animation element, resulting in a poor user experience. The dynamic adjustment of the playback of a haptic signal can be accomplished using the haptic playback adjustment system as described herein.

According to an embodiment, a playback of a haptic signal is when at least a portion of a haptic signal is sent to a haptic output device and causes the haptic output device to output at least one haptic effect. Further, a playback of a haptic signal is initiated when an instruction to send at least a portion of a haptic signal to a haptic output device is received. Even further, a playback of a haptic signal (i.e., a playback of one or more haptic effects) corresponds to a desired playback rate when either: a playback rate of the haptic signal is equal to a desired playback rate; or a playback of the haptic signal is synchronized with a playback of other input, where the playback of the other input is equal to a desired playback rate.

FIG. 1 illustrates a block diagram of a system 10 in accordance with one embodiment of the invention. In one embodiment, system 10 is part of a device (e.g., a mobile device or a wearable device), and system 10 provides a haptic playback adjustment functionality for the device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides the aforementioned functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic playback adjustment module 16 that adjusts a playback of haptic effects, as disclosed in more detail below. In certain embodiments, haptic playback adjustment module 16 can comprise a plurality of modules, where each module provides specific individual functionality for adjusting a playback of haptic effects. System 10 will typically include one or more additional application modules 18 to include additional functionality, such as Integrator™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electromagnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic signals to that device through communication device 20.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker. In alternate embodiments, system 10 can include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 30 can further be configured to convert the detected energy, or other physical property, into an electrical signal, or any signal that represents virtual sensor information. Sensor 30 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS$^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor. In alternate embodiments, system 10 can include one or more additional sensors, in addition to sensor 30 (not illustrated in FIG. 1). In some of these embodiments, sensor 30 and the one or more additional sensors may be part of a sensor array, or some other type of collection of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device can then send the converted signal to system 10 through communication device 20.

According to an embodiment of the invention, as previously described, a haptic playback adjustment system, such as system 10, can either statically or dynamically adjust a playback of a haptic signal. In order to statically adjust a playback of a haptic signal, haptic playback adjustment system 10 can implement one or more static adjustment techniques discussed in the following overview of static adjustment techniques.

In one embodiment, haptic playback adjustment system 10 can allow a haptic designer to author haptic effects for multiple playback rates by generating multiple haptic signals, where each haptic signal corresponds to a unique playback rate. Haptic playback adjustment system 10 can subsequently select a haptic signal from the multiple haptic signals based on a desired playback rate, where the selection of the haptic signal can be before a playback of the haptic signal is initiated. Haptic playback adjustment system 10 can subsequently send the selected haptic signal to a haptic output device, where a playback of the selected haptic signal corresponds to the desired playback rate.

In another embodiment, if an original haptic signal was originally generated by a haptic conversion algorithm (i.e., was originally converted from an original input signal, such as an audio signal, a video signal, an acceleration signal, a sensor output, etc.), haptic playback adjustment system 10 can convert the original input signal into a new input signal by resampling (e.g., up-sampling or down-sampling) the original input signal to a desired sampling rate. Haptic playback adjustment system 10 can generate a new haptic signal using the haptic conversion algorithm and the new input signal (i.e., the resampled input signal). The resulting new haptic signal would correspond to a desired playback rate as set by the desired resampling rate of the original input signal. Haptic playback adjustment system 10 can subsequently send the new haptic signal to a haptic output device, where a playback of the selected haptic signal corresponds to the desired playback rate.

In another embodiment, haptic playback adjustment system 10 can convert an original haptic signal into a new haptic signal that corresponds to a desired playback rate by resampling (e.g., up-sampling or down-sampling) the original haptic signal. Haptic playback adjustment system 10 can subsequently send the new haptic signal to a haptic output device, where a playback of the new haptic signal corresponds to the desired playback rate.

In another embodiment, haptic playback adjustment system 10 can convert the original input signal into a new input signal that corresponds to a desired playback rate by resampling (e.g., up-sampling or down-sampling) the original input signal. Haptic playback adjustment system 10 can further analyze the new input signal and identify one or more "key input events," where a "key input event" is a portion of an input data with one or more specified characteristics (e.g., frequency, amplitude, envelope, etc.). Haptic playback adjustment system 10 can further convert an original haptic signal into a new haptic signal by identifying one or more "key haptic events," where a "key haptic event" is a portion of haptic data with one or more specified characteristics (e.g., frequency, amplitude, envelope, etc.), and shifting the one or more key haptic events within the new haptic signal so that the one or more key haptic events align with the one or more key input events of the new input signal. By shifting a key haptic event within the new haptic signal so that the key haptic event aligns with a key input event of the new input signal, a position of the key haptic event within the new haptic signal is adjusted so that the position of the key haptic event aligns with a position of the key input event within the new input signal. Further, a position of a key haptic event aligns with a position of a key input event where a position of the key haptic event is either: (a) identical to a position of the key input event; or (b) substantially identical to a position of the key input event, where an effect that is output by an output device based on the key input effect and a haptic effect that is output by a haptic output device based on the key haptic effect both occur, or are both experienced, nearly simultaneously. After aligning the position of the key haptic event with the position of the key input event, haptic playback adjustment system 10 can optionally stretch (or shrink) the haptic signal to coincide with the number of frames for which they key input event is occurring. Haptic playback adjustment system 10 can subsequently send the new haptic signal to a haptic output device, where a playback of the new haptic signal corresponds to the desired playback rate.

The aforementioned static adjustment techniques are also further described below in greater detail.

In order to dynamically adjust a playback of a haptic signal, haptic playback adjustment system 10 can implement one or more dynamic adjustment techniques discussed in the following overview of dynamic adjustment techniques.

In one embodiment, haptic playback adjustment system 10 can allow a haptic designer to author haptic effects for multiple playback rates by generating multiple haptic signals, where each haptic signal corresponds to a unique playback rate. The multiple haptic signals can be encoded according to unique bit rates. The multiple haptic signals can further be stored within a single file or container. Haptic playback adjustment system 10 can subsequently select a haptic signal from the multiple haptic signals based on a desired playback rate, where the selection of the haptic signal can be after a playback of the haptic signal is initiated. Haptic playback adjustment system 10 can subsequently send the selected haptic signal to a haptic output device, where a playback of the selected haptic signal corresponds to the desired playback rate.

In another embodiment, haptic playback adjustment system 10 can divide a haptic signal into one or more haptlets, where a haptlet is a portion of the haptic signal that includes an index that indicates a position of the haptlet within the haptic signal. The division of the haptic signal can be performed either before a playback of the haptic signal is initiated or after a playback of the haptic signal is initiated. Subsequently, after a playback of the haptic signal is initiated, haptic playback adjustment system 10 can coordinate a playback of a selected number of the one or more haptlets. More specifically, for each haptlet, haptic playback adjustment system 10 can determine whether the haptlet is to be sent to a haptic output device. If the haptlet is selected, haptic playback adjustment system 10 can send the selected haptlet to the haptic output device, where the selected haptlet causes the haptic output device to output one or more haptic effects. If the haptlet is not selected, haptic playback adjustment system 10 does not send the haptlet to the haptic output device. In some embodiments, haptlets can be assigned a priority and the priority can be used as part of a basis for determining whether a haptlet is to be sent to a haptic output device.

In another embodiment, haptic playback adjustment system 10 can divide a haptic signal into one or more haptic blocks, where a haptic block is a portion of the haptic signal. The division of the haptic signal can be performed either before a playback of the haptic signal is initiated or after a playback of the haptic signal is initiated. Subsequently, after a playback of the haptic signal is initiated, haptic playback adjustment system 10 can configure a delay (also identified as a "sleep period" or "wait period") between playbacks of specified consecutive haptic blocks. More specifically, haptic playback adjustment system 10 can specify a delay for a specific duration based on a delay parameter after a playback of a first haptic block, and before a playback of a second haptic block (where the first and second haptic blocks are consecutive haptic blocks). During this duration, haptic playback adjustment system 10 does not play back a haptic block. In other words, during this duration, haptic playback adjustment system 10 does not send a haptic block to a haptic output device.

In another embodiment, after a playback of the haptic signal is initiated, haptic playback adjustment system 10 can receive one or more requests for a playback of the haptic signal within a specified time range that includes a start time and an end time. In response to a request, haptic playback adjustment system 10 can coordinate the playback of the haptic signal so that a playback of the haptic signal only occurs between the start time and the end time, and that the playback of the haptic signal is stopped once the end time is reached. This coordination by the haptic playback adjustment system can be repeated for each request.

In another embodiment, after a playback of the haptic signal is initiated, haptic playback adjustment system 10 can receive a request for an adjustment of a playback rate to a desired playback rate based on a timestamp. Haptic playback adjustment system 10 can calculate a number of haptic samples to be added to or removed from at least a portion of the haptic signal, where a haptic sample is a portion of haptic data contained within the haptic signal. Based on the calculated number of haptic samples to be added or removed, haptic playback adjustment system 10 can convert at least the portion of the haptic signal into a new haptic signal by resampling (e.g., up-sampling or down-sampling) at least the portion of the haptic signal. In certain embodiments, haptic playback adjustment system 10 can resample at least the portion of the haptic signal using one of the resampling techniques described below in greater detail.

One resampling technique involves removing "silent haptic samples" (also identified as "zero haptic samples") from the haptic signal, where a "silent haptic sample" is a haptic sample that contains haptic data whose value or values are below a pre-defined threshold value. A current haptic block (i.e., block of haptic data) of the haptic signal can be evaluated to select one or more locations where a silent haptic sample can be removed, and one or more silent haptic samples can be removed from the one or more selected locations. Subsequently, a new haptic block can be fetched if there are not enough haptic samples cached from previous adjustments. This resampling technique can be used in response to a request for an adjustment of a playback rate to an increased playback rate.

Another resampling technique involves adding silent haptic samples to the haptic signal. A current haptic block of the haptic signal can be evaluated to select one or more locations where a silent haptic sample can be added, and one or more silent haptic samples can be added to the one or more selected locations. Subsequently, the haptic block can be sent to a haptic output device. Subsequently haptic blocks can be held for subsequent playbacks. This resampling technique can be used in response to a request for an adjustment of a playback rate to a decreased playback rate.

Another resampling technique involves identifying one or more locations of the haptic signal where a haptic sample can be added. One or more haptic samples can be added to the one or more selected locations. Further, for each haptic sample, one or more values can be defined to be equal to a "nearest haptic sample" in a remaining portion of the haptic signal. A "nearest haptic sample" can be a haptic sample that is physically or logically located before or after an added haptic sample. This resampling technique can be used in response to a request for an adjustment of a playback rate to a decreased playback rate.

Another resampling technique involves identifying one or more locations of the haptic signal where a haptic sample can be added. One or more haptic samples can be added to the one or more selected locations. Further, for each haptic sample, one or more values can be defined to be an average of two nearest haptic samples in a remaining portion of the haptic signal. This resampling technique can be used in response to a request for an adjustment of a playback rate to a decreased playback rate.

Another resampling technique involves resampling a haptic block of the haptic signal at a specified rate in response to the request for an adjustment of a playback rate to a desired playback rate. Any subsequent adjustments can be applied to haptic blocks of the haptic signal that were not previously resampled. In other words, any haptic blocks of the haptic signal that were already resampled are not resampled again. This resampling technique can be used in response to a request for an adjustment of a playback rate to either an increased playback rate or a decreased playback rate.

The aforementioned dynamic adjustment techniques are also further described below in greater detail.

Figure 2:
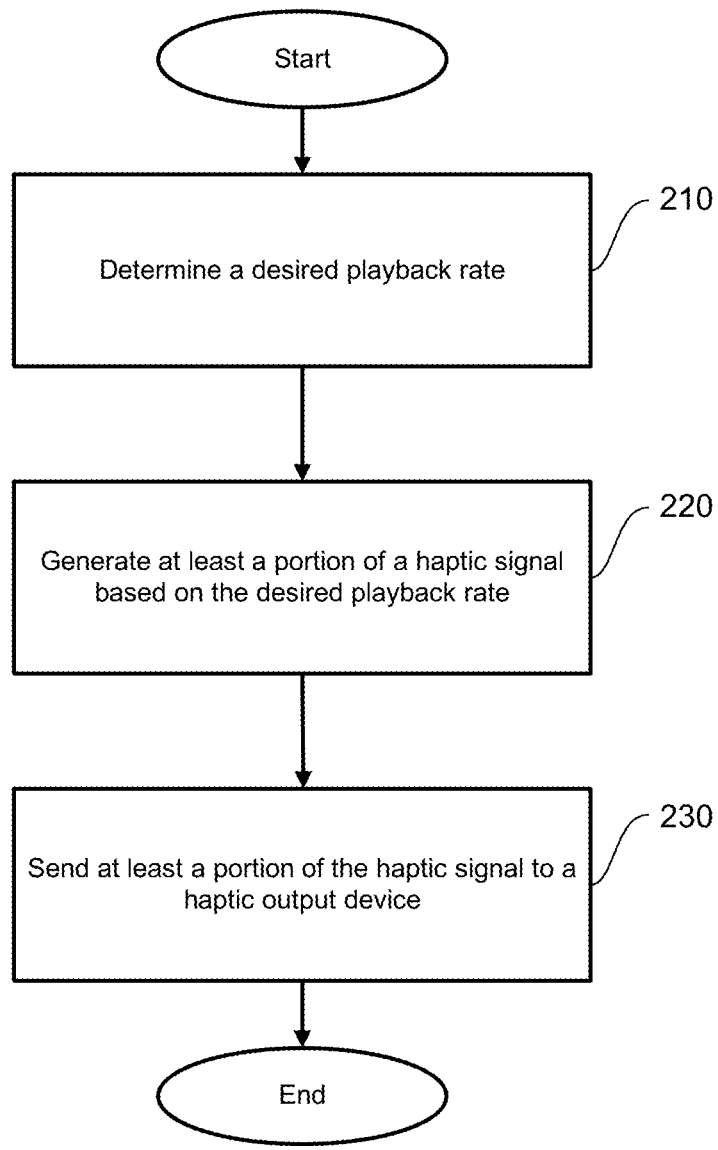
FIG. 2 illustrates a flow diagram of the functionality of a haptic playback adjustment module, according to an embodiment of the invention.

FIG. 2 illustrates a flow diagram of the functionality of a haptic playback adjustment module, according to an embodiment of the invention. In one embodiment, the functionality of FIG. 2, and FIGS. 3, 5, 7, 9, 11, 13, 15, 17, 19, 20, and 21, below, are implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 210. At 210, a desired playback rate is determined. In certain embodiments, the desired playback rate can be determined before a playback of the haptic signal is initiated. In other embodiments, the desired playback rate can be determined after a playback of the haptic signal is initiated. The flow then proceeds to 220. At 220, at least a portion of a haptic signal is generated based on the desired playback rate. In certain embodiments, only a portion of the haptic signal is generated based on the desired playback rate. In other embodiments, the entire haptic signal is generated based on the desired playback rate. In embodiments where the desired playback rate is determined before the playback of the haptic signal is initiated, at least the portion of the haptic signal can be generated using one or more of the aforementioned static techniques, where the one or more aforementioned static techniques are also further described below in greater detail. In other embodiments where the desired playback rate is determined after the playback of the haptic signal is initiated, at least the portion of the haptic signal can be generated using one or more of the aforementioned dynamic adjustment techniques, where the one or more aforementioned dynamic adjustment techniques are also further described below in greater detail. The flow then proceeds to 230. At 230, at least the portion of the haptic signal is sent to a haptic output device. At least the portion of the haptic signal causes the haptic output device to output one or more haptic effects. Further, a playback of the one or more haptic effects corresponds to the desired playback rate. The flow then ends.

Figure 3:
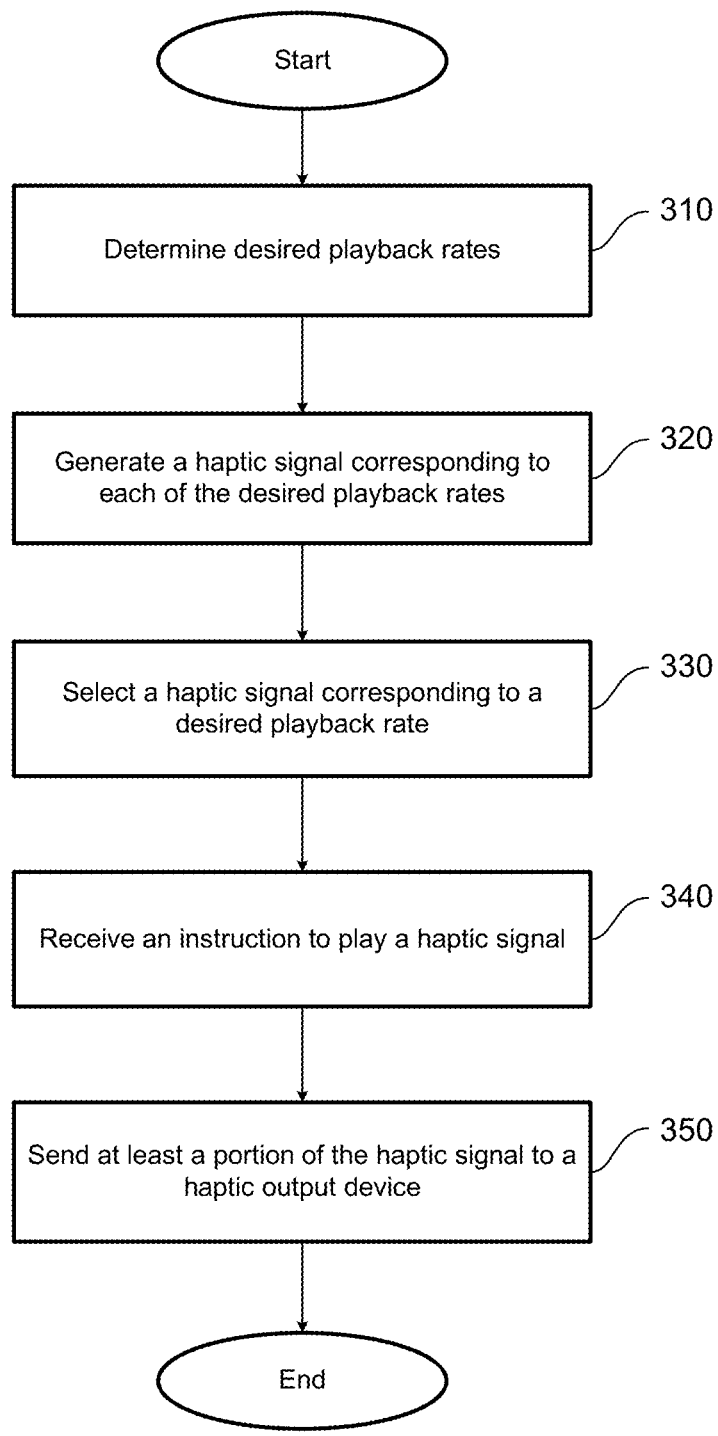
FIG. 3 illustrates a flow diagram of the functionality of a static haptic playback adjustment module, according to an embodiment of the invention.

FIG. 3 illustrates a flow diagram of the functionality of a static haptic playback adjustment module, according to an embodiment of the invention. The flow begins and proceeds to 310. At 310, a number of desired playback rates for a haptic signal can be determined. A nominal playback rate can be described as being 1× speed, that is, played at its normal speed. Other playback rates can be 0.7× speed, 1.5× speed, 2.0× speed, 2.5× speed, and so forth. Each of these speeds represents a multiplier of the nominal 1× speed. At 320, a haptic signal is generated for each of the desired playback rates. For example, the haptic signals can be authored using a haptic signal authoring tool or created by any of the methods described in this application for creating a haptic signal. At 330, a haptic signal corresponding to a desired haptic playback rate can be selected. For example, a user may want to slow down or speed up a video track corresponding to the haptic signal. The user can slow down or speed up the video track and slow down or speed up the corresponding haptic signal by the same amount by selecting one of the available haptic signals. For example, if a user speeds up a video signal by two, then the corresponding haptic signal can be selected as the 2× speed haptic signal. At 340, an instruction can be received to play a haptic signal, such as an instruction that can be received when playing back media with an associated haptic track containing a haptic signal. At 350, at least a portion of the haptic signal can be sent to a haptic output device, such as one of the haptic output devices described above in conjunction with FIG. 1. The flow then ends.

Figure 4:
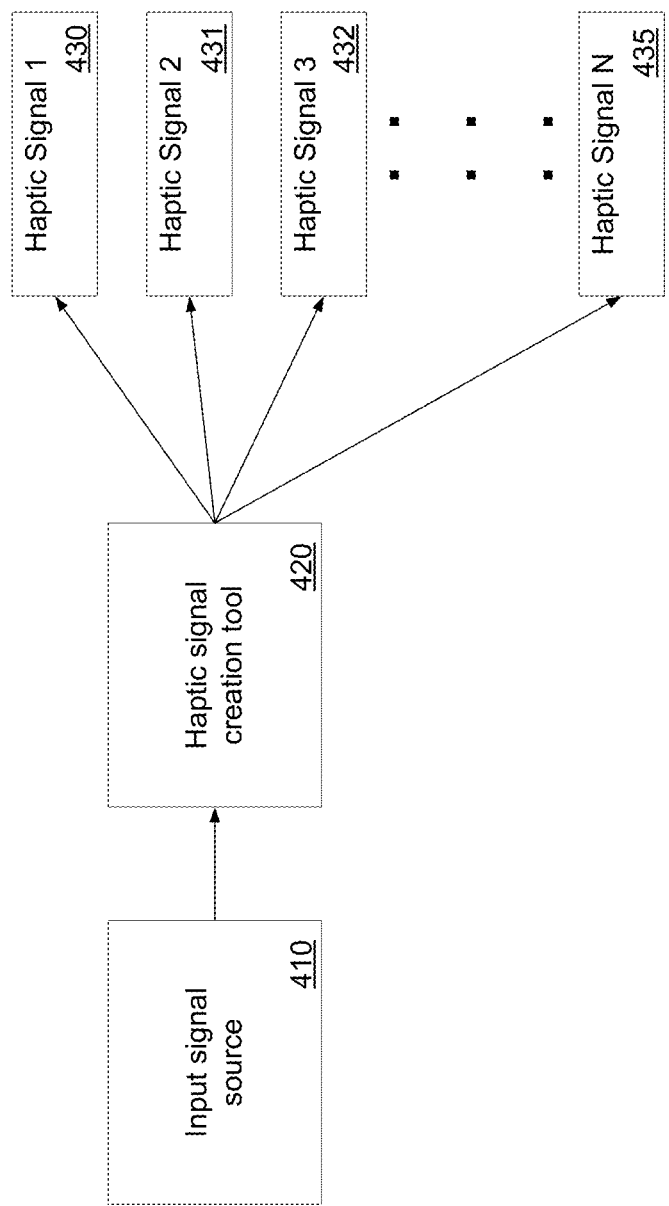
FIG. 4 illustrates a system for static adjustment of a haptic signal to provide multiple haptic signals at different speeds, in accordance with one embodiment.

FIG. 4 illustrates a system for static adjustment of a haptic signal to provide multiple haptic signals at different speeds, in accordance with one embodiment. Input signal source 410 can provide one or more input signals to a haptic signal creation tool 420. As described above, the input signal can be from any input source including audio, video, or one or more sensors, or any combination thereof. Haptic signal creation tool 420 can be a tool used by a haptic author to author haptic signals based on the input signals provided by one or more input signal sources. Haptic creation tool 420 can include software such as Haptic Studio, ProTools, Audacity, and the like. In some embodiments, haptic signal creation tool 420 can be a conversion tool to automatically analyze input signals and provide haptic signals based on the input signals. Haptic signal 1 430, haptic signal 2 431, haptic signal 3 432, and so forth until haptic signal N 435, each represent the output haptic signals from haptic signal creation tool 420. Haptic signals 430, 431, 432, and 435, are different haptic signal representations of the same input source signals, but provided at different sampling rates. For example, haptic signal 1 430 can be at 1× speed, that is, at the same sampling rate as the input source signals. Haptic signal 2 431 can be at 0.7× speed, haptic signal 3 432 can be at 2× speed, and haptic signal N 435 can be at 4× speed, where these different speeds are a multiplier of the original input source signals' sampling rate. These are only examples and different haptic signals can be provided at any discrete speed. Each of the resulting haptic signals 430, 431, 432, and 435 can represent an accurate haptic signal for the haptic input sources since each signal can be authored individually by a haptic designer who can identify "key moments" and align these manually and can interpolate haptic signals based on how long they should be relative to a corresponding event. However, for a large number of haptic signals, it may be tedious or impractical for a haptic designer to produce as many haptic signals as needed—one for each multiplier.

Figure 5:
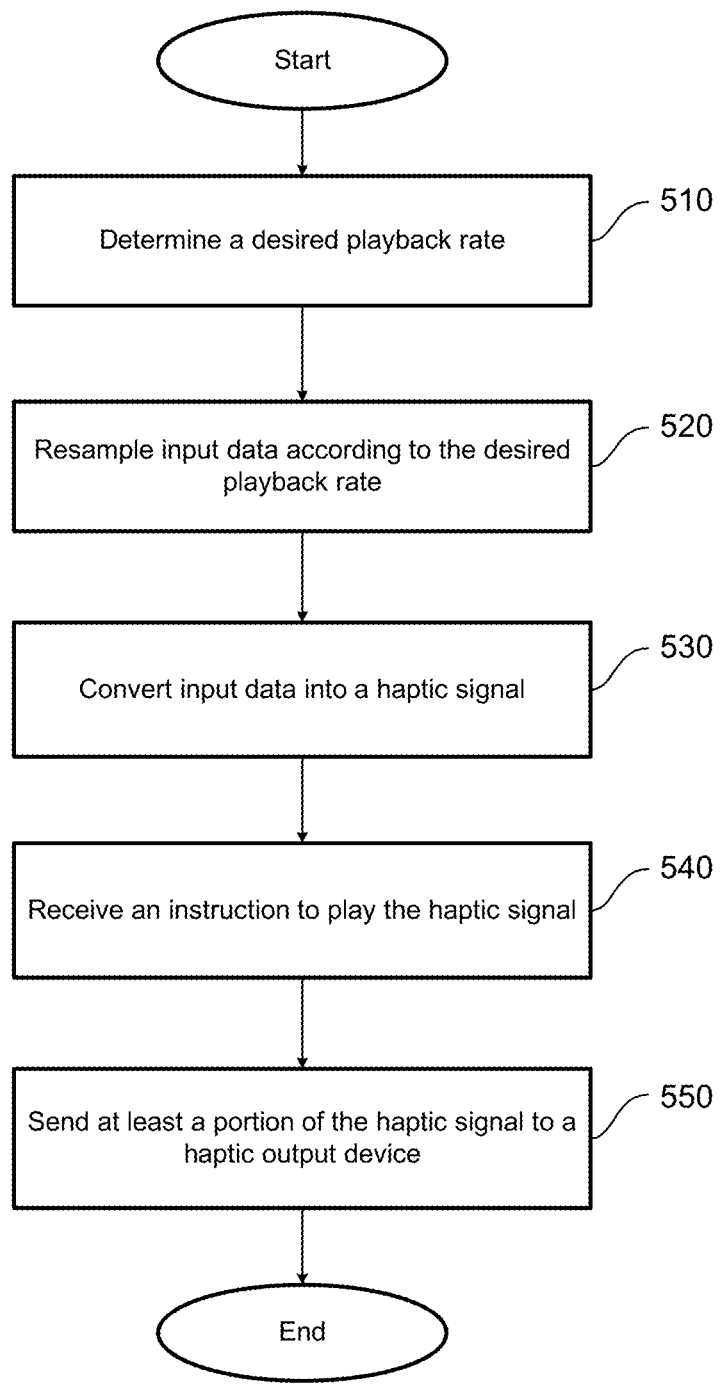
FIG. 5 illustrates a flow diagram of the functionality of a static haptic playback adjustment module, according to an embodiment of the invention.

FIG. 5 illustrates a flow diagram of the functionality of a static haptic playback adjustment module, according to an embodiment of the invention. The flow begins and proceeds to 510. At 510, a desired playback rate is determined. This can be determined by a setting which indicates the speeding up of or slowing down of a playback rate of an input (such as a media element like video or audio, or a sensor input) for which an accompanying haptic signal is desired. At 520, the input data can be resampled based on the desired playback rate. Appropriate resampling techniques include dropping frames, inserting frames, inserting frames with interpolation, such as linear, polynomial, spline, Gaussian, closest neighbor, or other resampling techniques. The resampling technique chosen can vary based on the type or source of input data. For example, resampling audio with one technique can be used and resampling video with another technique can be used.

At 530, the resampled input data is converted into a haptic signal. A conversion tool can provide an input signal to haptic signal conversion. Because the input signal was resampled, the haptic signal produced will be at the desired playback rate. At 540, an instruction can be received to play the haptic signal. At 550, at least a portion of the haptic signal can be sent to a haptic output device, such as one of the haptic output devices described above in conjunction with FIG. 1. The flow then ends.

Resampling the input signal can be done in addition to or instead of another resampling operation normally used to generate a haptic signal. For example, in a normal playback situation, a sensor's data may be captured at 1 kHz, then upsampled to 8 kHz and converted to a haptic track using a haptic converter. In a 2× playback situation, the sensor data can be upsampled again (or instead) to 16 kHz and converted using the same haptic converter to result in a 2× haptic signal. Likewise, for 4× playback, the sensor data can be upsampled to 32 kHz and converted to a haptic signal to result in a 4× haptic signal. For 0.5× playback the sensor data can be upsampled to 4 kHz and converted. Similarly, if sensor data is downsampled to 200 Hz to generate a normal haptic signal it can be downsampled less to 400 Hz to generate a 2× haptic signal or downsampled further to 100 Hz to generate a 0.5× haptic signal.

Figure 6:
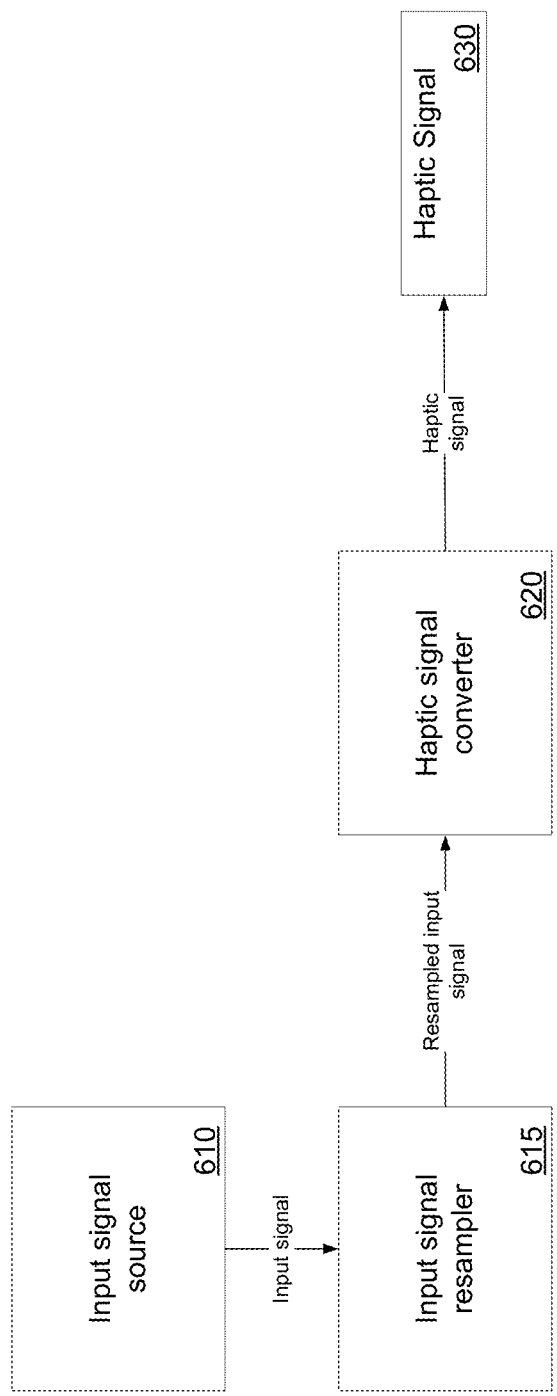
FIG. 6 illustrates a system for static adjustment of a haptic signal by resampling an input signal, in accordance with one embodiment.

FIG. 6 illustrates a system for static adjustment of a haptic signal by resampling an input signal, in accordance with one embodiment. Input signal source 610 can provide one or more input signals to an input signal resampler 615. As described above, each input signal can be from any input source including audio, video, one or more sensors, or any combination thereof. Input signal resampler 615 can resample the one or more input signals to make them slower (i.e., longer by drawing them out) or faster (i.e., shorter by compacting them). The one or more input signals can each be resampled at different rates given an input signal's initial sampling rate and the corresponding conversion algorithm requirements (i.e., different types of input signals can have different conversion algorithms with different requirements). The resampled one or more input signals can be provided to a haptic signal converter 620 which will take the one or more resampled signals and convert them into one haptic signal 630.

Figure 7:
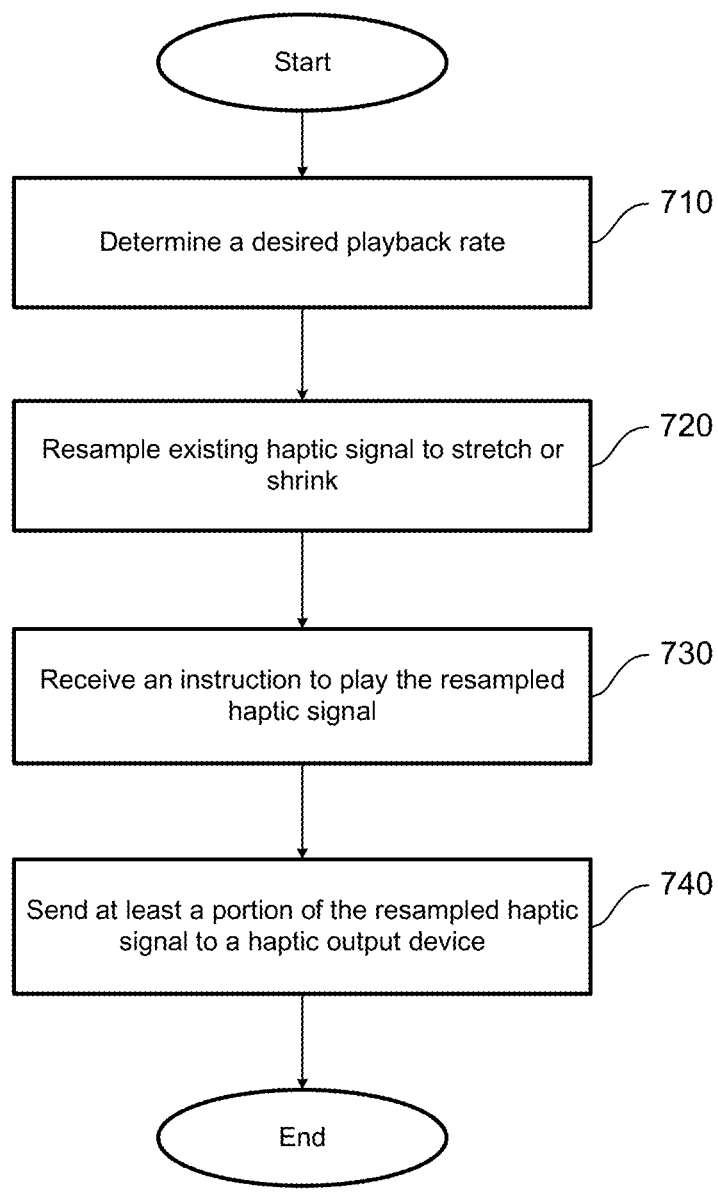
FIG. 7 illustrates a flow diagram of the functionality of a static haptic playback adjustment module, according to an embodiment of the invention.

FIG. 7 illustrates a flow diagram of the functionality of a static haptic playback adjustment module, according to an embodiment of the invention. A haptic signal has already been authored or provided based on one or more input signals. The flow begins and proceeds to 710. At 710, a desired playback rate is determined. This can be determined by a setting which indicates the speeding up of or slowing down of a playback rate of a media element corresponding to the haptic signal which the haptic signal is designed to accompany. At 720, the haptic signal can be resampled to stretch or shrink the playback time of the haptic signal. For example, to shrink the haptic signal, samples can be dropped, averaged (i.e., replaced by an average of a number of samples), or represented by another value or feature of combining their values. To stretch the haptic signal, additional samples can be added. Samples can be added using techniques discussed above, including inserting zero value samples, inserting samples with interpolation, such as linear, polynomial, spline, Gaussian, closest neighbor, and so forth. In some embodiments, the playback rate of the haptic signal can be altered instead. For example, a haptic signal with a playback rate of 8 kHz can be played at 10 kHz instead, effectively shrinking the signal by 25%. Or, for example, a haptic signal with a playback rate of 8 kHz can be played at 4 kHz instead, effectively stretching the signal by 200%.

In some embodiments, audio processing tools can be used for resampling. The haptic signal can be treated as an audio track and processed using stretching/shrinking filters implemented in audio processing toolboxes. At 730, an instruction can be received to play the resampled haptic signal. At 740, at least a portion of the resampled haptic signal can be sent to a haptic output device, such as one of the haptic output devices described above in conjunction with FIG. 1. The haptic signal can be played at the original sampling rate since the signal itself has been altered. The flow then ends.

Figure 8:
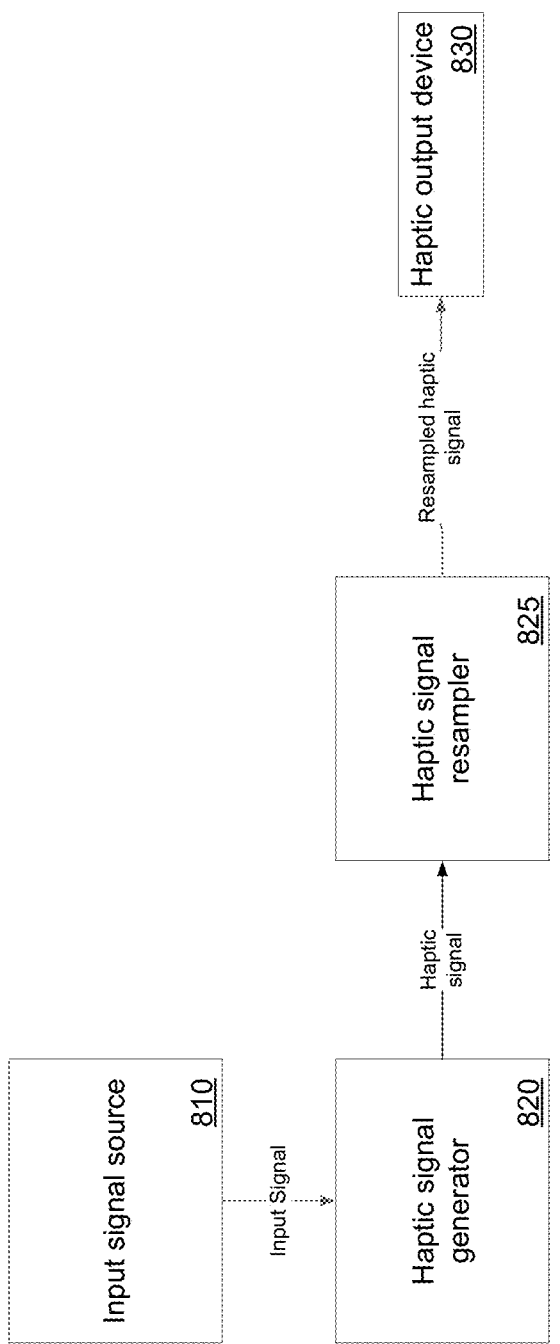
FIG. 8 illustrates a system for static adjustment of a haptic signal by resampling a haptic signal, in accordance with one embodiment.

FIG. 8 illustrates a system for static adjustment of a haptic signal by resampling a haptic signal, in accordance with one embodiment. Input signal source 810 can provide one or more input signals to a haptic signal generator or converter 820. Haptic signal generator or converter 820 can create a haptic signal from the one or more input signals using a haptic authoring tool (not pictured) or a haptic converter. A haptic designer can use a haptic authoring tool to create a haptic signal based on the one or more input signals. A haptic converter can convert the one or more input signals into a single or combined haptic signal. The resulting haptic signal can be provided to haptic signal resampler 825. Haptic signal resampler can resample the signal to provide a stretched or shrunken haptic signal based on a desired playback rate input or setting. To shrink the haptic signal, haptic resampler 825 can drop samples, average them (i.e., replace two or more by an average of a number of samples), or represent sample values by another value or feature of combining their values. To stretch the haptic signal, haptic resampler 825 can add samples using techniques such as inserting zero value samples, inserting samples with values determined using linear interpolation, inserting samples with values determined using nearest neighbor values, or inserting frames with values derived from other resampling techniques. The resampled haptic signal can be provided to a haptic output device 830, which can correspond to haptic output device 26 of FIG. 1.

Stretching or shrinking a haptic signal, such as provided by the flow of FIG. 7 or system of FIG. 8, might create artifacts in the haptic track as the newly created haptic signal may produce a haptic effect that might feel slightly out of sync. For example, in a snowboarding video clip, a snowboard landing can be accompanied by a haptic effect covering 2 frames of the video in normal playback. For a slow motion playback extending the playback by 8 times, the same effect would be stretched to 16 frames of the video. However, the slow motion playback may show the landing only lasting 4 frames of the new video signal, which makes the haptic effect distracting, irrelevant, and feeling out of sync for the remaining 12 frames. The flow of FIG. 9 can provide a solution for this issue.

Figure 9:
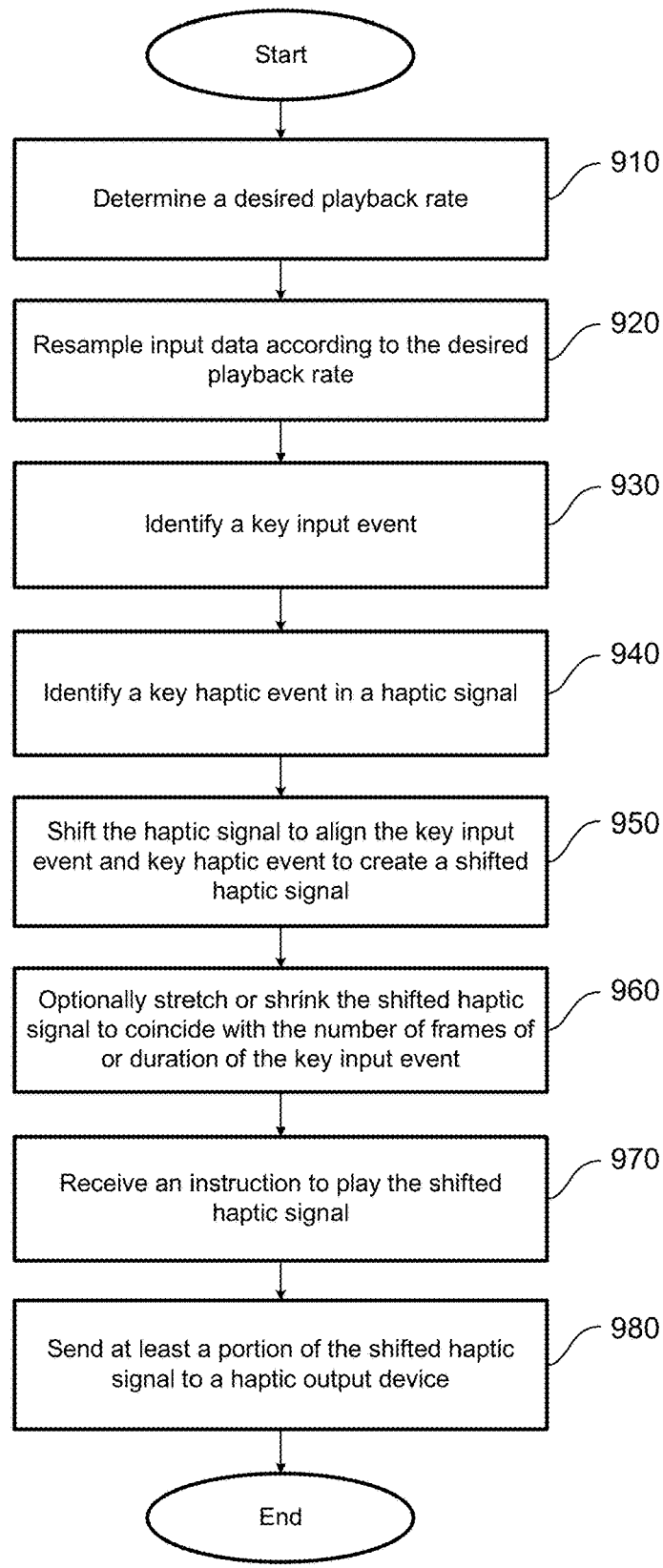
FIG. 9 illustrates a flow diagram of the functionality of a static haptic playback adjustment module, according to an embodiment of the invention.

FIG. 9 illustrates a flow diagram of the functionality of a static haptic playback adjustment module, according to an embodiment of the invention. A haptic signal has already been authored or provided based on one or more input signals. The flow begins and proceeds to 910. At 910, a desired playback rate is determined. This can be determined by a setting which indicates the speeding up of or slowing down of a playback rate of a media element corresponding to the haptic signal which the haptic signal is designed to accompany. At 920, the input data can be resampled based on the desired playback rate. Appropriate resampling techniques are discussed above and can include dropping frames, inserting frames, inserting frames with interpolation, such as linear, polynomial, spline, Gaussian, closest neighbor, and so forth, or other resampling techniques. The resampling technique chosen can vary based on the type or source of input data. For example, resampling audio with one technique can be used and resampling video with another technique can be used.

For example, video playback can be slowed in different ways. Given a "normal" playback speed of 30 fps, video is normally displayed for 33.333 ms. A video captured at 120 fps and played back at 30 fps will be perceived as 4× slow motion video. The 120 fps video can be perceived as 2× slow motion by dropping every other frame, thus using only 60 fps of the 120 fps available, but still displaying each frame for 33.333 ms. Video captured at 30 fps can provide for a slow motion effect by displaying each frame longer than 33.333 ms. For example, if each frame is displayed for 100 ms (10 fps) instead, the video would appear to be 3× slower than normal speed. Video captured at 30 fps can provide for 2× slow motion by inserting another frame between every frame and using the values of the neighboring frames to interpolate the values of the inserted frame.

At 930, one or more "key input events" are identified in one or more input source signals. When identifying a "key input event," the timing and duration of the event is estimated. As described above, a "key input event" is a portion of an input data with one or more specified characteristics (e.g., frequency, amplitude, envelope, etc.). For example, a key input event can be found where one or more specified characteristics meets a certain threshold or pattern that can be associated with an event which would trigger a haptic output. The idea is that because an event is instantaneous most of the time, slowing down the event in a video source, for example, does not necessarily slow down the haptics by the same amount. The instantaneous event will be highlighted as being more discreet in a slowed clip. For example, a punch can occur on a single frame of a video in normal playback. At 8 times slow motion, the same punch can still occur on a single frame of the video in slow motion playback and not over 8 frames. As with the snowboard, however, some events may still span multiple frames in slow motion, but may not span double the number of frames. For example, an explosion may span 2 frames in normal playback of a video, may span 8 frames in slow motion playback of the video (but not 16 frames).

Any available valid data can be used to try and localize the exact moment of the key input event and its duration. For example, the snowboarding example may also have as available valid data input sensory data including gyroscope and accelerometer feeds. These feeds can be used to find more specific key event timing than could be offered by a video feed.

A valid data signal is any data describing the media content (audio, video, or sensors) captured with a sampling time gap that is smaller than the original time gap between the frames to be displayed. For example, in a 4× slow motion video captured at 120 fps, all the available frames can be used by playing back the captured frames at 30 fps. The time gap between the start of each frame is 8.333 ms as captured. For a data signal to be valid, it should also have a sampling rate of 120 Hz or higher. Otherwise, error can be introduced. For example, if the sampling rate was only 20 Hz, then there are 50 ms between samples. To base the key moment off of this data could offset the key moment to the video by as many as 6 frames, which would result in a poor haptic effect, as explained in greater detail below. In a 2× slow motion video captured at 120 fps, every other frame can be dropped, resulting in 60 fps and a time gap between displayed frames of 16.667 ms as originally displayed. Here, a valid data signal can be sampled at 60 Hz or higher. Localizing the event timing and duration can be done by computer vision techniques for visual information data (e.g., block and edge analysis) or any other appropriate audio or signal processing approaches for other data types (e.g., frequency analysis, envelope analysis, acoustic events detection, etc.).

At 940, one or more "key haptic events" can be identified in a haptic signal, where the haptic signal corresponds to a haptic signal created from the original one or more input signals. As described above, a "key haptic event" is a portion of haptic data with one or more specified characteristics (e.g., frequency, amplitude, envelope, etc.). At 950, each key haptic event can be shifted in the haptic stream to correspond to the key input events of the resampled input data to create a new shifted haptic signal. In shifting the key haptic events to the key input events, the alignment of key haptic events (and the associated haptic output signal) can be accomplished more accurately than simply resampling the haptic signal. However, shifting the existing haptic signal, rather than creating a new haptic signal from the resampled input data can be accomplished more efficiently. The alignment of the key input event with the key haptic event can be done according to the criteria previously described, that is, that a position of a key haptic event aligns with a position of a key input event where a position of the key haptic event is either: (a) identical to a position of the key input event; or (b) substantially identical to a position of the key input event, where an effect that is output by an output device based on the key input effect and a haptic effect that is output by a haptic output device based on the key haptic effect both occur, or are both experienced, nearly simultaneously.

At 960, the haptic signal at the key haptic events can optionally be stretched or shrunken to coincide with the number of frames of or duration of the key input event. For example, the key input event of the resampled signal may last for 30 frames. The key haptic event may last for 10 frames. The haptic signal corresponding to the key haptic event can be stretched to coincide with the input event at 30 frames or coincide partially with the input event at 20 frames (or some other number of frames). For example, if the key input event is an explosion, the initial explosion may last 15 frames, with a corresponding key haptic event lasting 20 frames. If the desired playback rate is to slow down playback to 0.5 speed, then the input signal can be stretched to 30 frames through resampling. The resampled input data, however, may indicate that the key input event actually occurred starting at relative frame 2 in the new resampled data. The haptic signal corresponding to the key haptic event can be shifted to the key input event to begin at frame 2 and run for 20 frames. Next, the haptic key event signal can be stretched another 9 frames to match the duration of the key input event.

At 970, an instruction can be received to play the shifted haptic signal. At 980, at least a portion of the shifted haptic signal can be sent to a haptic output device, such as one of the haptic output devices described above in conjunction with FIG. 1. The flow then ends.

As discussed above, video playback can be slowed in different ways. For example, a video captured at 120 fps can be played back at 30 fps to be perceived as 4× slow motion video. In this case, as discussed above, any valid data signal at 120 Hz or above can be used to localize the key input events.

Video captured at 30 fps can provide for a slow motion effect by displaying each frame longer than 33.333 ms, for example 100 ms (10 fps) for 3× slow motion. In this case, as discussed above, valid data signal at 30 Hz or above can be used. Whereas in normal playback a haptic effect may span 3 frames, the techniques described in the flow of FIG. 9 can be used to localize the haptic effect to the central frame by finding the central frame to be the closest to the localized time. Also, the haptic effect can be stretched or shrunken to play for the entire frame, even if the event can be localized using a valid data signal captured at 120 Hz such that the event may actually take place in a time shorter than 100 ms. In other words, the haptic effects can be adjusted to align with the video frames, rather than an absolute timing. As such, the video playback can be adjusted to 2×, or 66.667 ms and the haptic signal would still align with the frame, both in start moment and duration. As an example, a frame sequence would normally be displayed as 1, 2, 3. A corresponding haptic signal can be output as x, x, x (where 'x' is a haptic effect), lasting 100 ms. If displaying each frame longer, at 3×, the frames would be displayed as 1, 1, 1, 2, 2, 2, 3, 3, 3. If the haptic signal were stretched to compensate, the haptic signal would be output as x, x, x, x, x, x, x, x, x, lasting 300 ms. A key moment analysis can determine that the key moment occurs closest to frame 2. Playing back the haptic effect in the first three frames and last three frames would be beyond a typical perception integration window threshold and as a result a user would note that the resulting haptic effect does not align with the video. Using the flow of FIG. 9, the haptic signal can be associated with frame 2 so that the haptic signal is output as follows: o, o, o, x, x, x, o, o, o.

Video captured at 30 fps can provide for 2× slow motion by inserting another frame between every frame and using the values of the neighboring frames to interpolate the values of the inserted frame. In this case, the effective sampling rate is interpolated to be 60 fps. As such, a valid data signal should be sampled at 60 Hz or above to localize key input events.

To continue the snowboarding example described above, the flow of FIG. 9 can identify a key input event of a resampled input signal, resulting in an identified key input event corresponding to the snowboard landing and taking 4 frames. The haptic signal can be analyzed for a key haptic event and the aligned to the key input event. Then the 2 frame haptic signal can be stretched to 4 frames to coincide with the key input event.

In another example, a boxing match can be augmented with haptic feedback. When replaying a knock-out punch, without stretching the haptic effects, the haptic effects might disappear as there may not be any way to stretch the haptic information. In another configuration, the system may simply slow the haptic signal by the same amount as a corresponding video signal and the resulting haptic effect may not align properly to the video signal, ruining the haptic effect. This may not be a problem in normal playback speed because the effect may quickly cover pre and post frames of the actual punch as well, but not in a way that is discernible from the punch landing. In another configuration, at slow playback speed, the haptic signal can be shifted based on a key input event found in a resampled signal and a key haptic event in the haptic signal. The haptic signal can further be stretched to coincide with the key input event duration.

Figure 10:
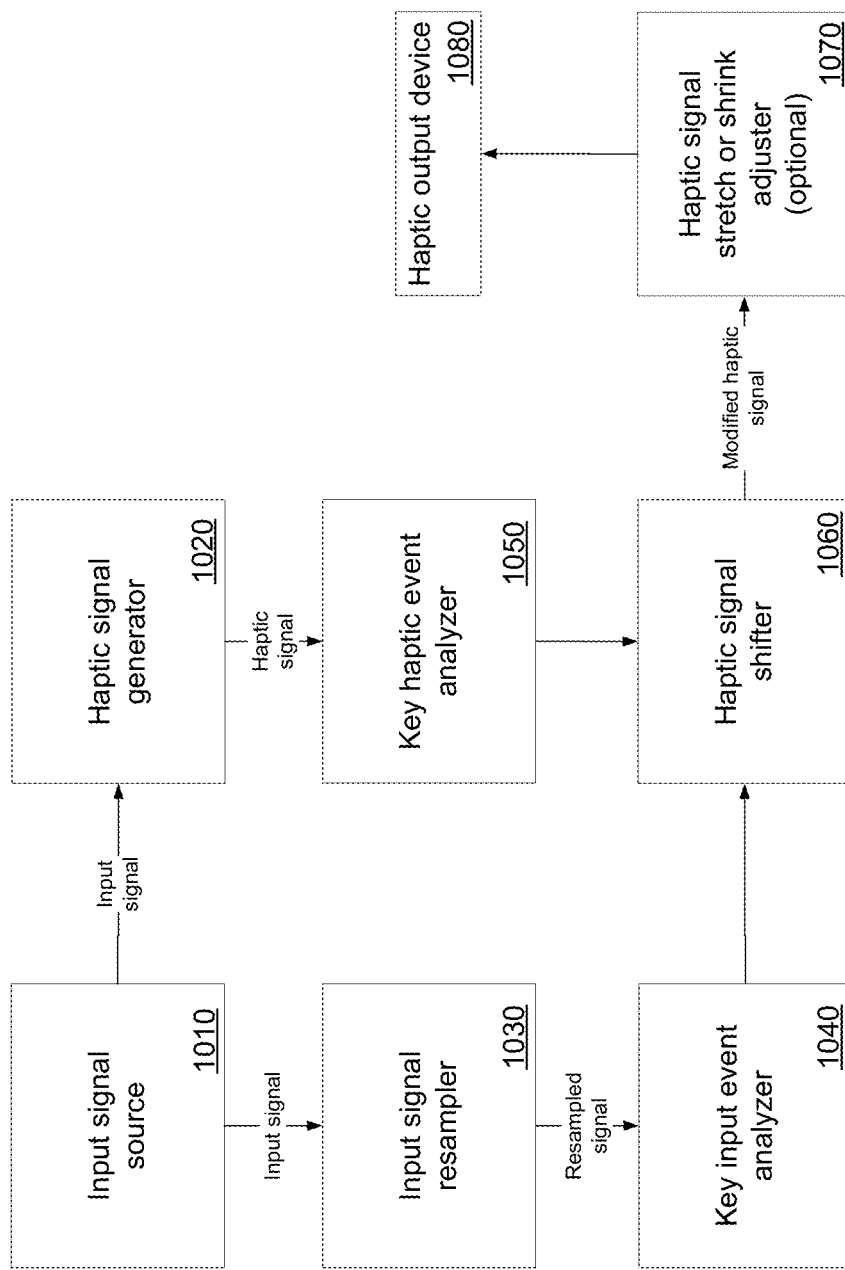
FIG. 10 illustrates a system for static adjustment of a haptic signal by analyzing key events, in accordance with one embodiment.

FIG. 10 illustrates a system for static adjustment of a haptic signal by analyzing key events, in accordance with one embodiment. Input signal source 1010 can provide one or more input signals a haptic signal generator 1020. Input signal source 1010 can also provide one or more input signals to a haptic signal generator 1020. As described above, each input signal can be from any input source including audio, video, one or more sensors, or any combination thereof. Input signal resampler 1020 can resample the one or more input signals to make them slower (i.e., longer by drawing them out) or faster (i.e., shorter by compacting them). The resampled one or more input signals can be provided to a key input event analyzer 1040 which can take the one or more resampled signals and identify key events in the input data. The haptic signal from haptic signal generator 1020 can be provided to key haptic event analyzer 1050 and identify key events in the haptic signal. Haptic signal shifter 1060 can shift the haptic signal to align with the key input events and provide a modified haptic signal. The modified haptic signal can optionally be stretched or shrunken at one or more of the key haptic events in the haptic signal by a haptic stretch or shrink adjuster 1070. Haptic stretch or shrink adjuster 1070 can provide a further modified haptic signal to haptic output device 1080. In embodiments without haptic stretch or shrink adjuster 1070, the modified haptic signal from haptic signal shifter 1060 can be provided directly to haptic output device 1080. Haptic output device 1080 can play at least a portion of the haptic signal and provide a haptic effect.

In dynamic haptic playback adjustment systems, a haptic signal can be played along with a media element. A media element can be any type of video, animation, visual alert, audio, auditory alert, or gaming effect that can have a corresponding haptic effect. One example of a media element can be a short video animation, such as a sticker animation in a chat session can be played along with a corresponding haptic signal, which when rendered or played on a haptic output device provides a haptic effect. Depending on the device on which the animation is played, the haptic information may play at a different playback rate than the animation. For example, the animation may play quickly on devices with fast processors or few background processes running, or the animation may play slower on devices with slower processors or many background processes running. Also, depending on the media element, such as an animation, the animation may have sections with more elements in motion causing the animation to play slower as the playback system copes with handling all of the elements of the animation. Any variation in the playback of the animation can cause the playback of the corresponding haptic signal to become out of sync with the media element. Not only would the haptic effect not have the intended effect of augmenting the animation, but would likely detract from the effectiveness of the animation.

In some embodiments, playback speed of a haptic signal can be dynamically adjusted based on a parameter, such as a parameter associated with a sensor. For example, a parameter specifying the rate of movement of a finger on a touchscreen can correspond to a texture based haptic effect that changes based on the rate of movement. Another parameter could be the output of a sensor corresponding to the ground speed of a device.

Figure 11:
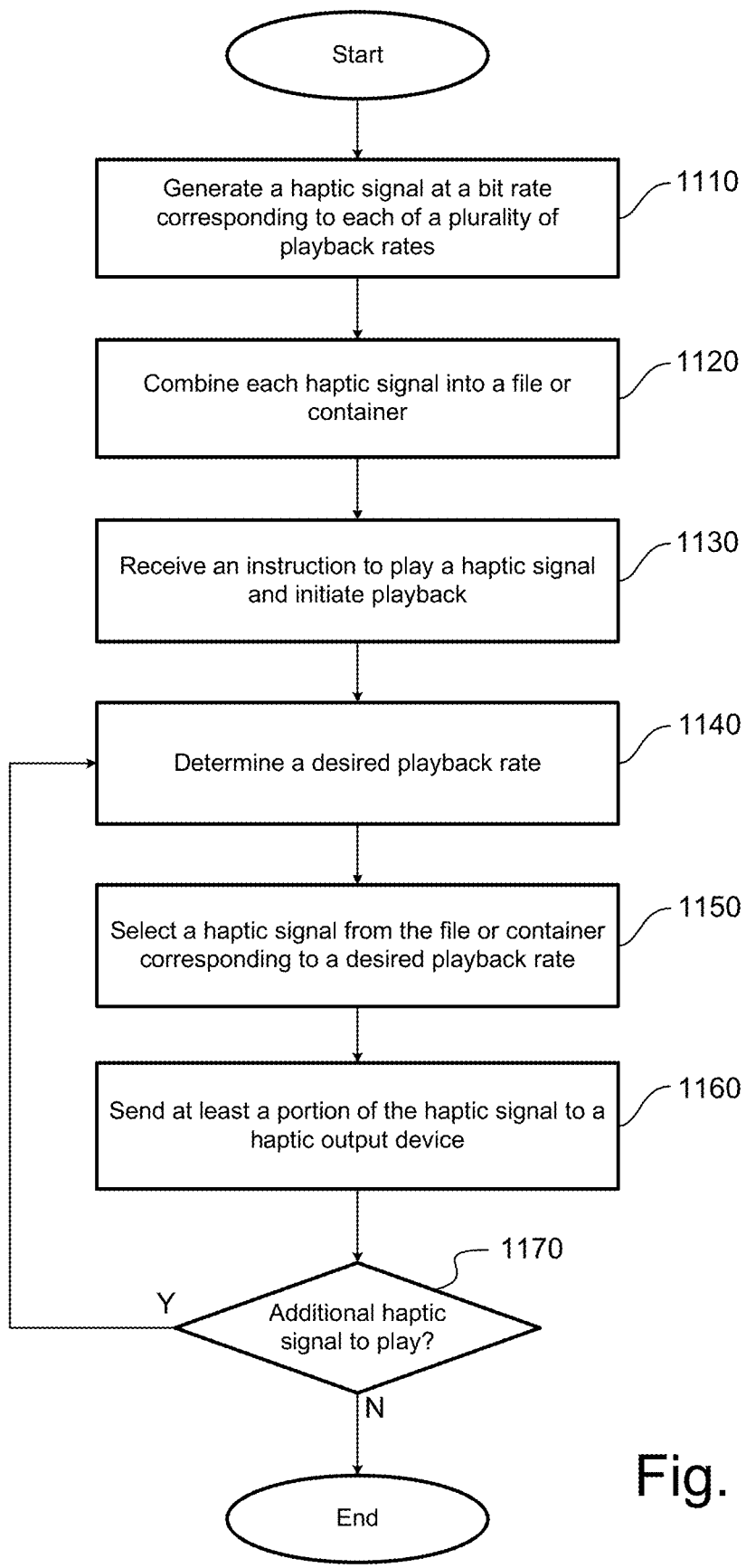
FIG. 11 illustrates a flow diagram of the functionality of a dynamic haptic playback adjustment module, according to an embodiment of the invention.

FIG. 11 illustrates a flow diagram of the functionality of a dynamic haptic playback adjustment module, according to an embodiment of the invention. The flow begins and proceeds to 1110. At 1110, a haptic signal is generated at a bit rate corresponding to each of a plurality of playback rates. Each generated haptic signal can be authored individually or result from a conversion process of data from one or more input signals. A playback rate can vary based on the bit rate of each of the haptic signals. For example a haptic signal with a bit rate of 200 bps can represent a normal playback speed. A haptic signal with a bit rate of 300 bps can represent a fast playback speed of 1.5 times the speed of the normal playback speed. This is because the same amount of data in the haptic signal can be played at a faster rate per second, resulting in a faster playback. Similarly, a haptic signal with a bit rate of 100 bps can represent a slow playback speed of 0.5 times the speed of the normal playback speed. Each of the individual haptic signals can be further adjusted to adjust the values of the haptic signal in addition to the bit rates. At 1120, each of the haptic signals can be combined into a single file or container. These can be multiplexed, interleaved, or listed one after another with a pointer or header describing where in the file each haptic signal begins and/or ends.

At 1130, an instruction to play a haptic signal can be received and playback of the haptic signal initiated. At 1140, a desired playback rate can be determined. The desired playback rate can be determined based on one or more of the playback rate of a corresponding media element, the known capabilities of the device playing the media element and haptic signal, or a calculated deficiency between the actual playback of the media element and haptic signal. For example, the calculated deficiency could note that the media element is playing faster than the haptic element. In embodiments where the playback rate is based on a parameter, the desired playback rate can be determined based on the parameter, such as the rate of movement of a finger on a touchscreen or the ground speed of a device. At 1150, a haptic signal can be selected from the file or container of available haptic signals, where the selected signal corresponds to a desired playback rate. At 1160, at least a portion of the selected haptic signal can be sent to a haptic output device. At 1170, if more of the haptic signal is left to play, the flow can continue back to 1140 to determine whether the desired playback rate should be adjusted again. At 1170, if there is no more of the haptic signal left to play, the flow can end.

Figure 12:
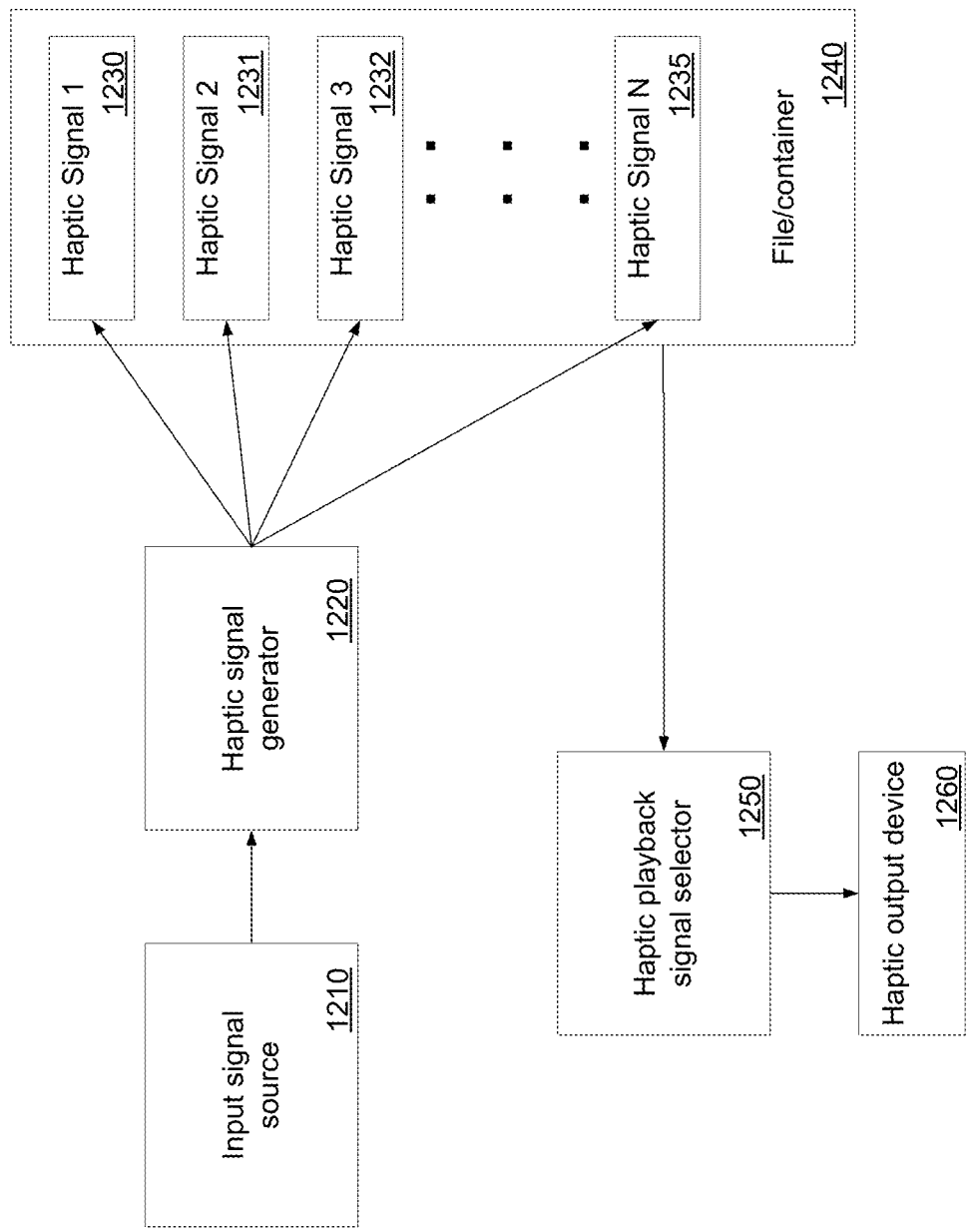
FIG. 12 illustrates a system for dynamic adjustment of a haptic signal by selecting a haptic signal, in accordance with one embodiment.

FIG. 12 illustrates a system for dynamic adjustment of a haptic signal by selecting a haptic signal, in accordance with one embodiment. One or more input signal sources 1210 can be provided to haptic signal generator 1220 to produce a plurality of haptic signals, each at a different bit rate to represent a different playback speed of the haptic signals. Haptic signal 1 1230 can be at a first bit rate; haptic signal 2 1231 can be at another bit rate; haptic signal 3 1232 can be at yet another bit rate; haptic signal N 1235 can be at another bit rate, and so forth. All of the haptic signals can be contained within a file or container 1240. Container 1240 can be provided to a haptic playback signal selector 1250 which can dynamically select a haptic signal to play with an accompanying media element (not shown) or in response to a parameter and provide the selected haptic signal to haptic output device 1260.

Figure 13:
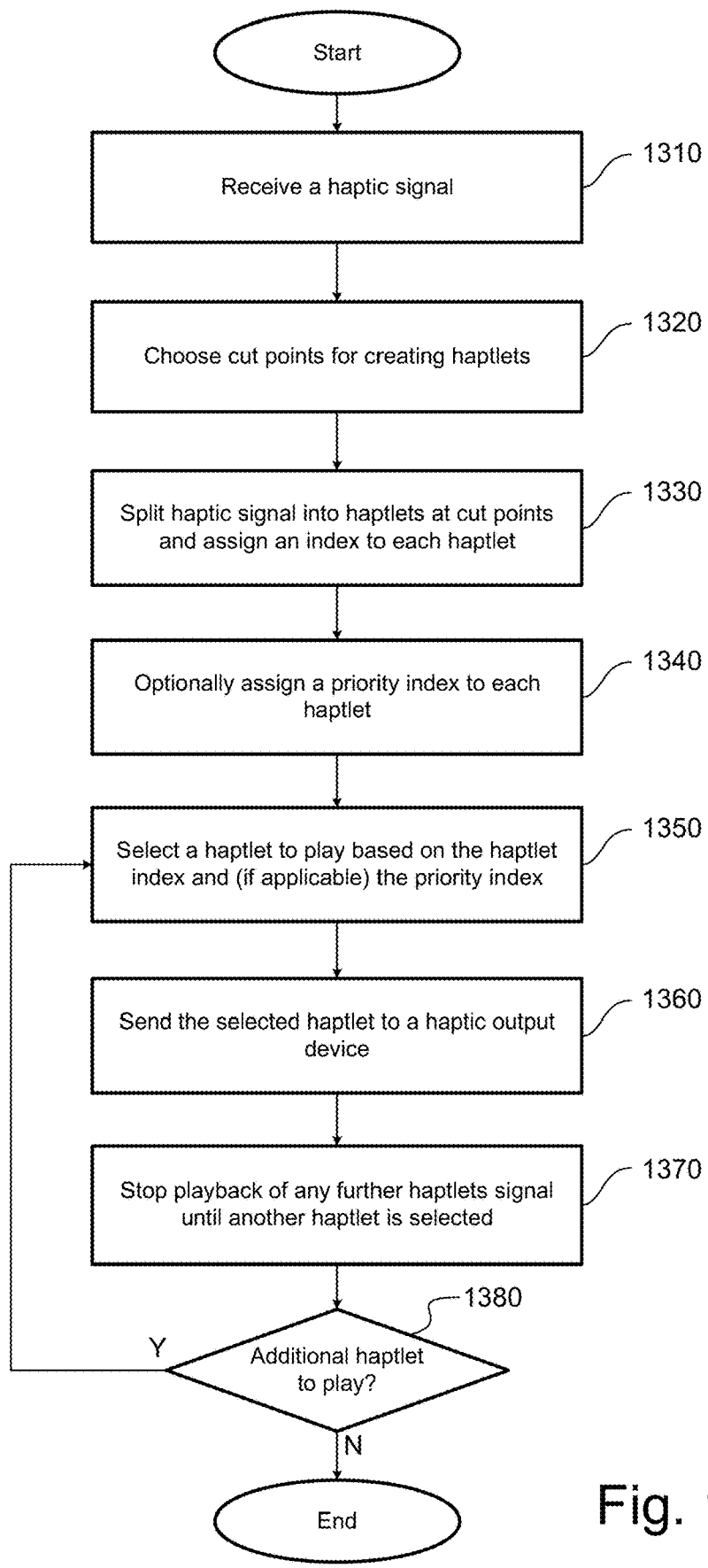
FIG. 13 illustrates a flow diagram of the functionality of a dynamic haptic playback adjustment module, according to an embodiment of the invention.

FIG. 13 illustrates a flow diagram of the functionality of a dynamic haptic playback adjustment module, according to an embodiment of the invention. A haptic signal has already been created from input data related to an input source. The flow begins and proceeds to 1310. At 1310, the haptic signal can be received to play on a haptic output device. At 1320, cut points can be chosen for cutting the haptic signal into haptlets. As described above, a haptlet is a portion of the haptic signal that includes an index that indicates a position of the haptlet within the haptic signal. A haptlet cut point can be found at a place in the haptic signal at haptically silent (zero-value) points or nearly silent points. The number of haptlets can be configurable and can match the number of frames of a media element. A haptlet cut point can also correspond to the beginning of a frame of a corresponding media element. At 1330, the haptic signal can be split into haptlets at the cut points and an index can be assigned to each haptlet. In some embodiments, haptlets can be created before playback has been initiated, for example, after creation of the haptic signal, but before requesting playback of the haptic signal. In some embodiments, haptlets can be created after playback has been initiated. At 1340, in some embodiments, a haptlet priority value can also optionally be assigned to each haptlet. For example, haptlets containing less haptic information or lower haptic values than a neighboring haptlet can be assigned a lower priority.

At 1350, a haptlet can be selected to play based on the haptlet index and, if applicable, the priority index. For example, a media element can refer to haptlet indexes and when each index is encountered in the playback of the media element, the haptlet is selected. At 1360, the selected haptlet can be sent to a haptic output device. If the haptic output device is already playing a haptlet, in some embodiments, playback of the haptlet can be interrupted to play the new haptlet, while in other embodiments, playback of both haptlets can occur at the same time for the overlapping period. At 1370, when the haptlet has finished playing, no other haptlet will play until another haptlet is selected. At

1380, if there are additional haptlets to play, the flow will continue to 1350 to select another haptlet, and if there are no additional haptlets to play the flow will end. Using the flow of FIG. 13, playback of a haptic signal can adjust according to the playback speed of a media element or input parameter. Playback can adjust dynamically so that if the media element playback slows (perhaps due to increased background activity on the playback device or due to complexity in the media element) or the parameter specifies slower playback, corresponding haptic playback can also slow by delaying playback of the next haptlet. Further, haptlets of low priority can be skipped, for example, if playback of a corresponding media element is faster than the haptic signal would play or if a parameter specifies faster playback of a haptic signal than a normal playback speed.

Figure 14:
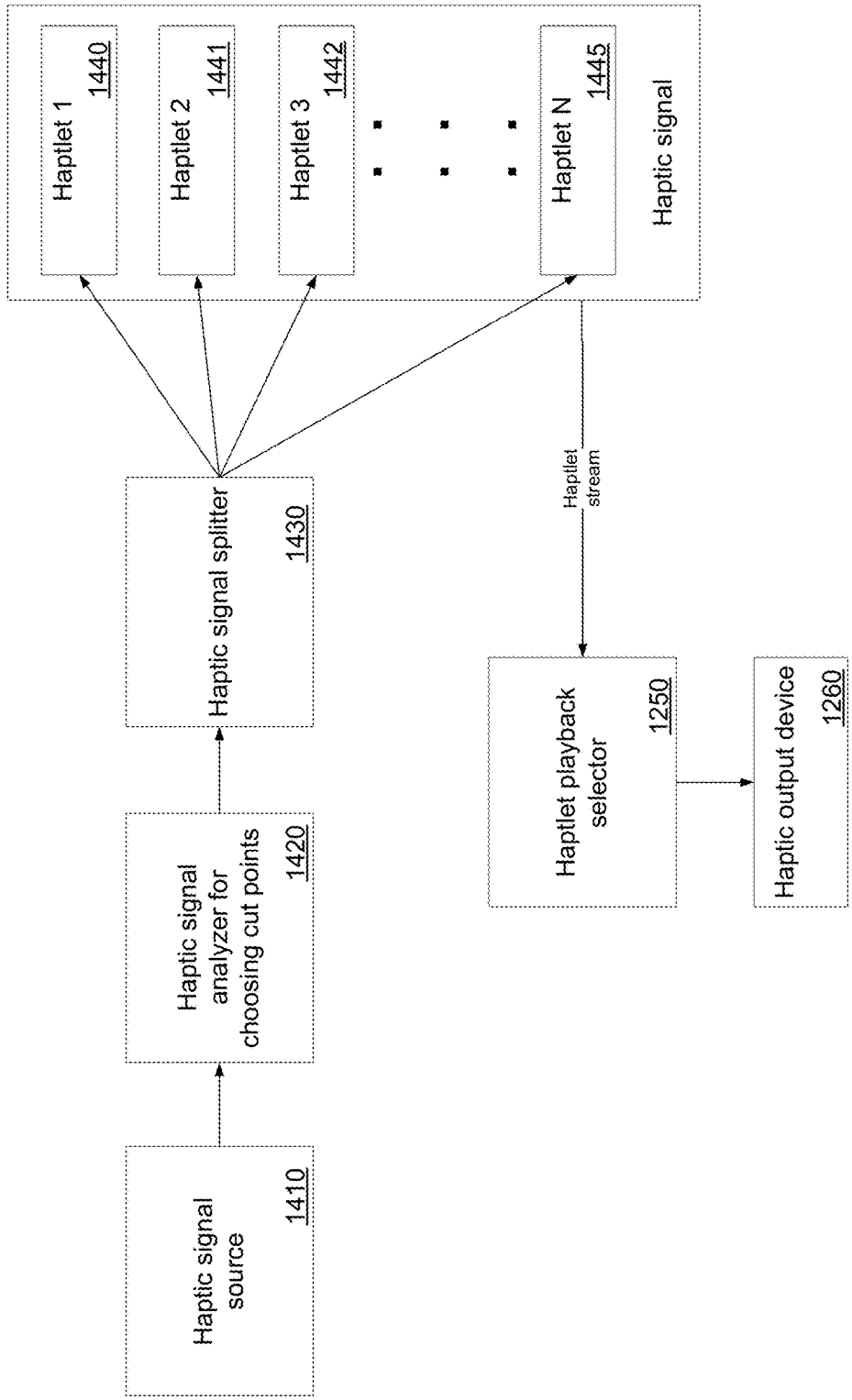
FIG. 14 illustrates a system for dynamic adjustment of a haptic signal by selecting a haptlet, in accordance with one embodiment.

FIG. 14 illustrates a system for dynamic adjustment of a haptic signal by selecting a haptlet, in accordance with one embodiment. A haptic signal source 1410 can provide a haptic signal to a haptic signal analyzer 1420 for choosing cut points of the haptic signal. A haptic signal splitter 1430 can use the cut points to cut the haptic signal into haptlet 1 1440, haptlet 2 1441, haptlet 3 1442, and so forth up to haptlet N 1445. The haptlets can be organized into the haptic signal. The haptic signal can be sent as a stream of haptlets to a haptlet playback selector 1250 which will choose a haptlet to play based on the index of the haptlet. Optional priority values for the haptlets can also be used by haptlet playback selector 1250 as additional criteria to evaluate when selecting a haptlet. The selected haptlet can be sent to haptic output device 1260 for playback, resulting in a haptic effect.

Figure 15:
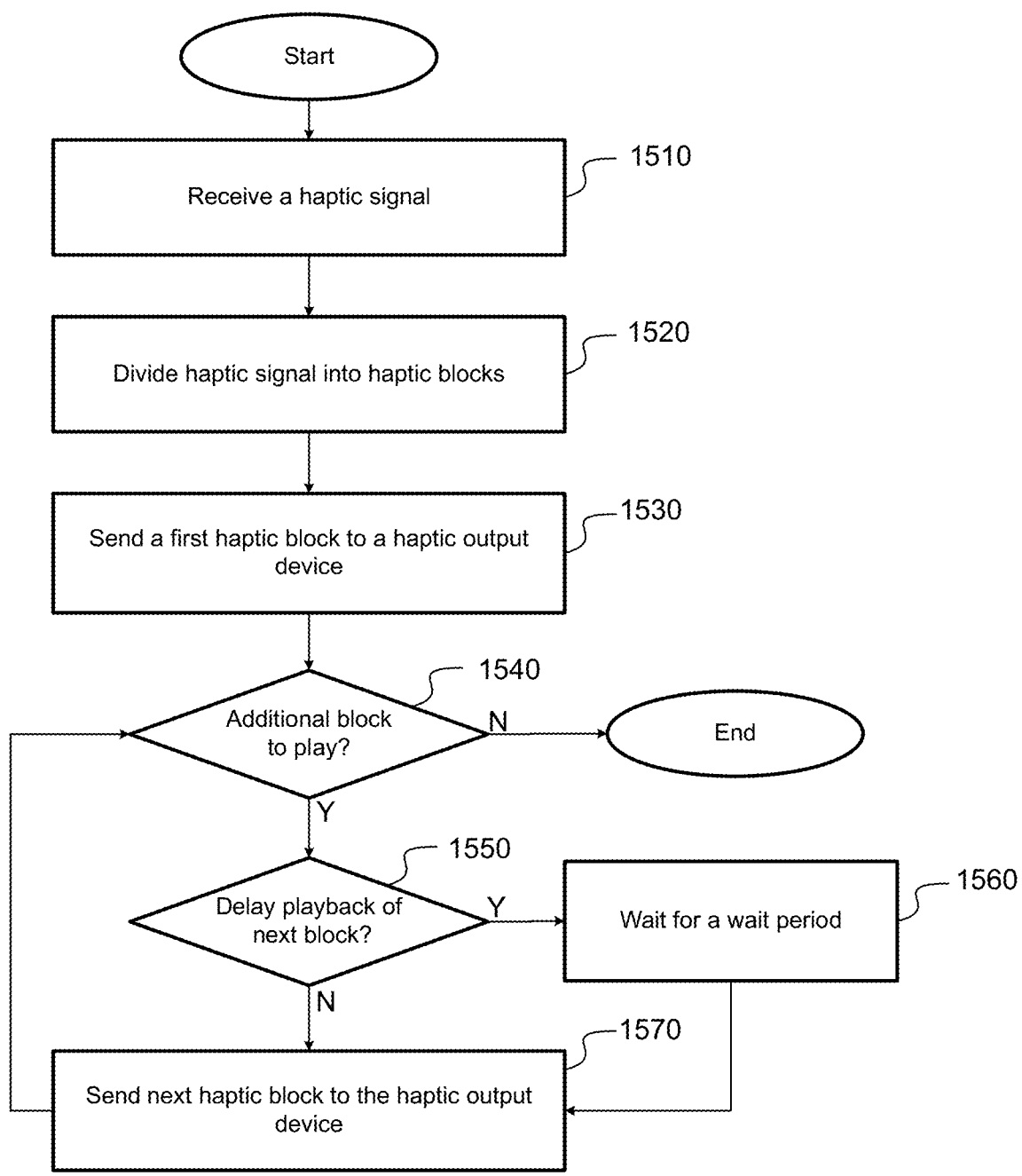
FIG. 15 illustrates a flow diagram of the functionality of a dynamic haptic playback adjustment module, according to an embodiment of the invention.

FIG. 15 illustrates a flow diagram of the functionality of a dynamic haptic playback adjustment module, according to an embodiment of the invention. A haptic signal has already been created from input data related to an input source. The flow begins and proceeds to 1510. A haptic signal can be received. At 1520, the haptic signal can be divided into haptic blocks. As described above, a haptic block is a portion of the haptic signal. The division of the haptic signal can be performed either before a playback of the haptic signal is initiated or after a playback of the haptic signal is initiated. The division of the haptic signal into haptic blocks can be done uniformly or in a varied manner so that haptic blocks can each be the same length or different lengths. In some embodiments, haptic block length can be determined based on the overall length of the haptic signal. For example, a signal can be split into 8000 blocks, so that each haptic block represents a time of length of haptic signal divided by 8000. In some embodiments, a haptic block can be created for a set amount of haptic signal data. For example a haptic block can be created for every 50 ms of haptic signal. The total number of haptic blocks for a haptic signal would then be the time in seconds of length of the haptic signal times 20.

At 1530, a first haptic block can be sent to a haptic output device. At 1540, if there are no additional haptic blocks to play, the flow will end. If there are additional haptic blocks to play, at 1550 if playback of the next haptic block should be delayed, then at 1560 a wait period will occur. After the wait period, at 1570, the next consecutive haptic block can be sent to the haptic output device. If there was no wait period from 1550, the next consecutive haptic block can immediately be sent to the haptic output device at 1570. Flow will then continue back to 1540 to determine if there are additional blocks to play. The wait period in 1560 can be calculated based on the playback speed of a media element corresponding to the haptic signal or a based on an input parameter. As such, the wait period in 1560 can either be provided by a client or calculated based on the playback rates of a media element and haptic signal. Playback can adjust dynamically so that if the media element playback slows (perhaps due to increased background activity on the playback device or due to complexity in the media element) or a parameter specifies slower playback, corresponding haptic playback can also slow by delaying playback of the next haptic block.

Figure 16:
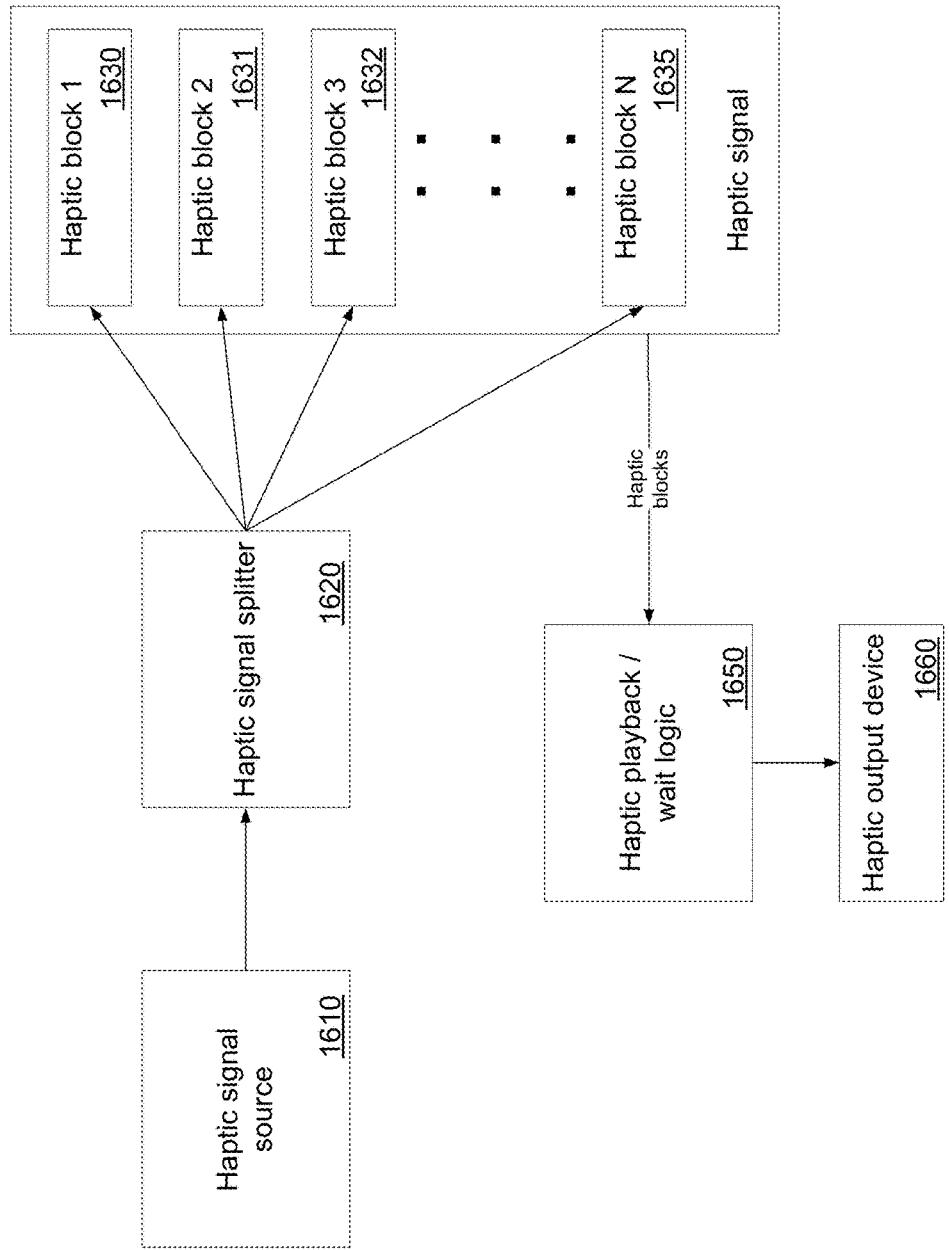
FIG. 16 illustrates a system for dynamic adjustment of a haptic signal by playing haptic blocks, in accordance with one embodiment.

FIG. 16 illustrates a system for dynamic adjustment of a haptic signal by playing haptic blocks, in accordance with one embodiment. A haptic signal source 1610 can provide a haptic signal to a haptic signal splitter 1620 for splitting the haptic signal into haptic block 1 1630, haptic block 2 1631, haptic block 3 1632, and so forth up to haptic block N 1635. As described above, haptic blocks can be split according to a number of different schemes. The haptic blocks can be sent as the haptic signal to a haptic playback/wait logic 1650. Haptic playback/wait logic 1650 will play the haptic blocks in their order but can wait between playback of each block to slow overall playback of the haptic signal. Haptic playback/wait logic 1650 can send haptic blocks to haptic output device 1660 to play them to produce a haptic effect.

Figure 17:
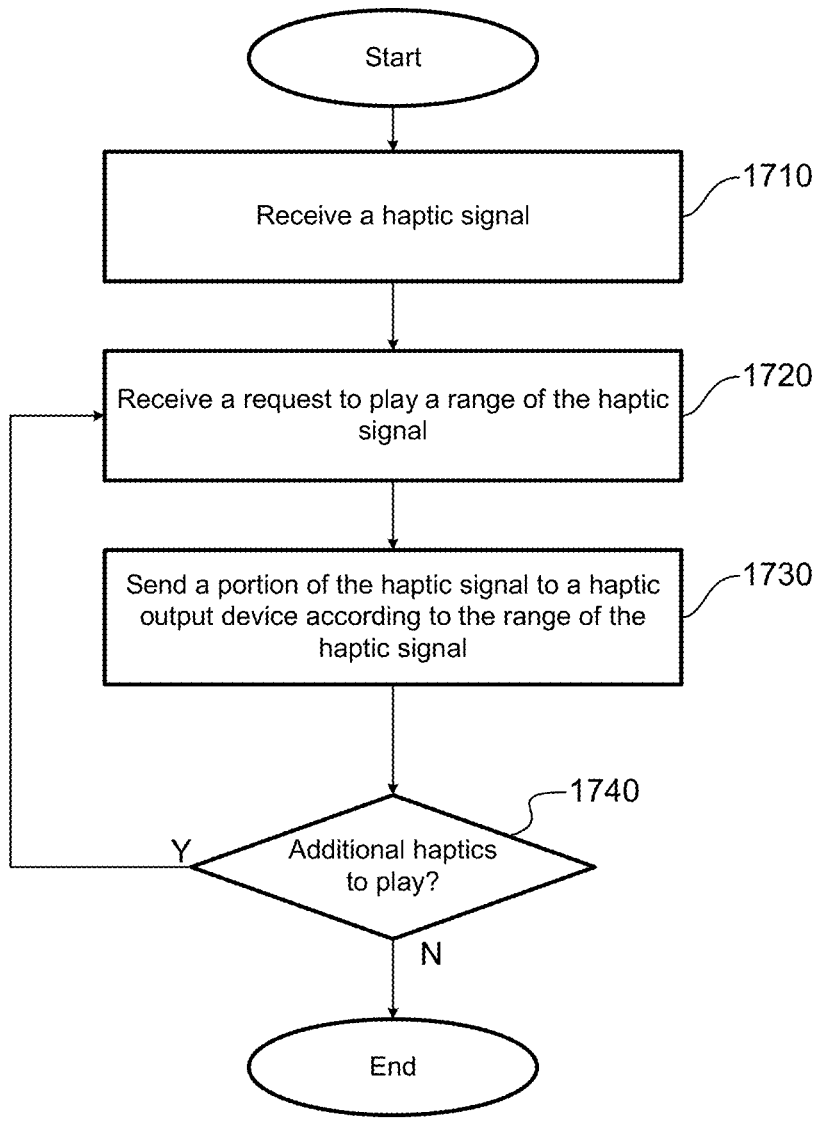
FIG. 17 illustrates a flow diagram of the functionality of a dynamic haptic playback adjustment module, according to an embodiment of the invention.

FIG. 17 illustrates a flow diagram of the functionality of a dynamic haptic playback adjustment module, according to an embodiment of the invention. A haptic signal has already been created from input data related to an input source. The flow begins and proceeds to 1710. At 1710, a haptic signal can be received. At 1720, a request can be received to play a range of the haptic signal. For example, the request can contain a starting time and duration or a starting time and end time of the portion of the haptic signal to play. The request can be received, for example, from a playback device playing a media element and requesting a haptic signal range from a haptic signal corresponding to the media element, where the haptic signal range corresponds to a range of the media element played back on a playback device. Or, the request can be received, for example, based on an input parameter, such as a finger movement parameter or ground speed parameter. At 1730, a portion of the haptic signal can be sent to a haptic output device, where the portion corresponds to the requested range of the haptic signal. In some embodiments, the subset of the haptic signal corresponding to the requested range can be sent to a playback device which in turn can play the range on a haptic output device. The range of the haptic signal will play continuously from the start position to the end position (or for the specified duration). At 1740, if there are additional haptics to play in the file another request can be received at 1720 to play a range of the haptic signal. At 1740, if no additional haptics are available to play in the haptic signal, the flow can end.

Figure 18:
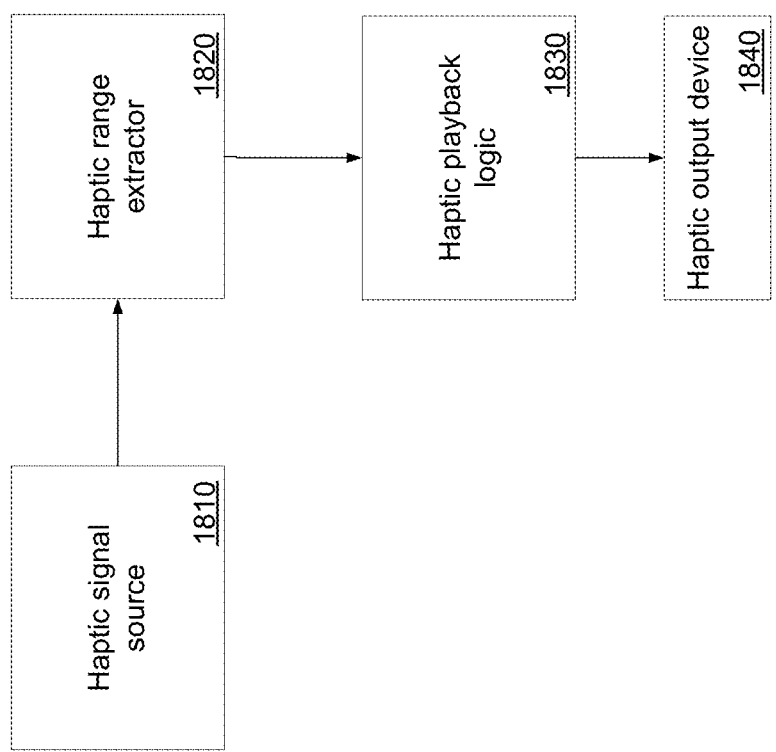
FIG. 18 illustrates a system for dynamic adjustment of a haptic signal by playing a range of a haptic signal, in accordance with one embodiment.

FIG. 18 illustrates a system for dynamic adjustment of a haptic signal by playing a range of a haptic signal, in accordance with one embodiment. A haptic signal source 1810 can provide a haptic signal to a haptic range extractor 1820 for extracting a specified range of the haptic signal as an extracted haptic signal. The extracted haptic signal can be provided to haptic playback logic 1830, which in turn can provide it to haptic output device 1840 to produce a haptic effect. In some embodiments, elements 1820 and 1830 can be the same element.

Figure 19:
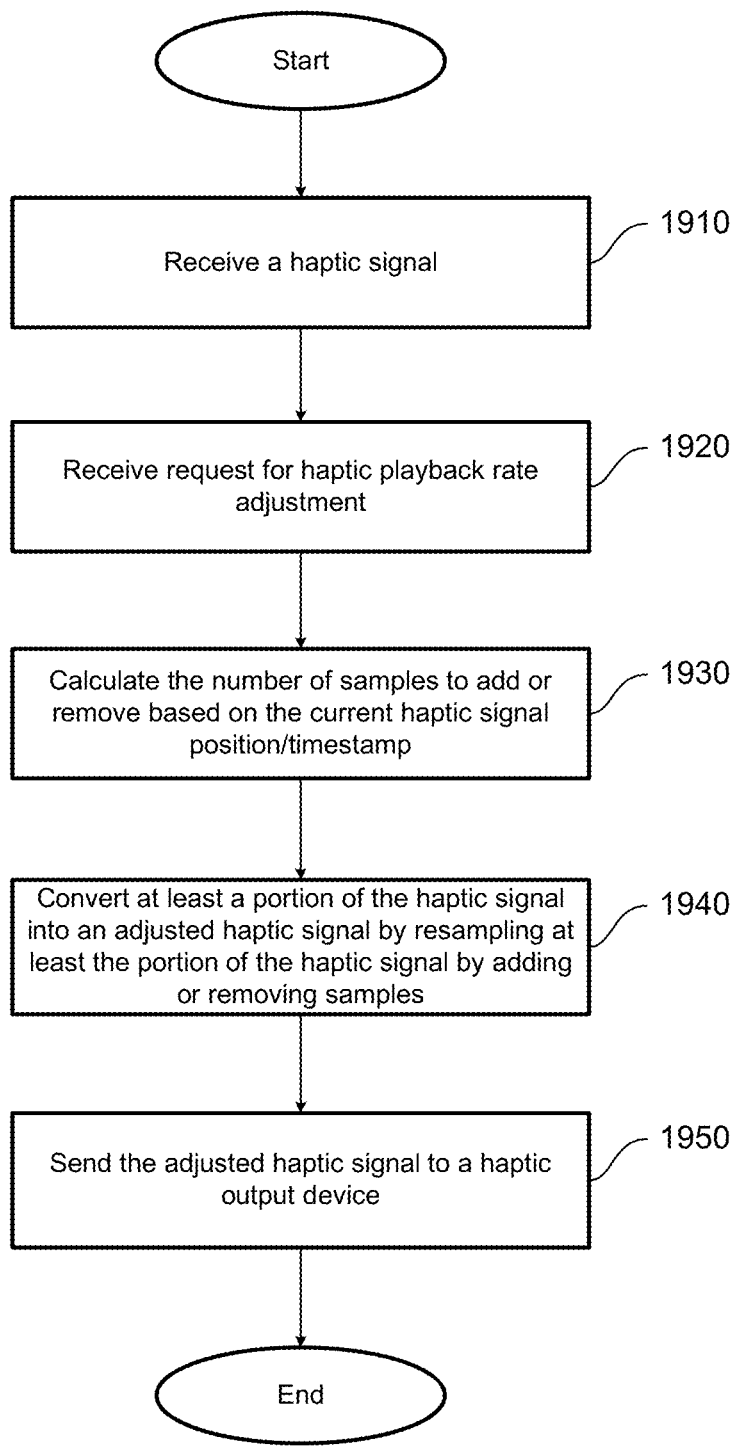
FIG. 19 illustrates a flow diagram of the functionality of a dynamic haptic playback adjustment module, according to an embodiment of the invention.

FIG. 19 illustrates a flow diagram of the functionality of a dynamic haptic playback adjustment module, according to an embodiment of the invention. A haptic signal has already been created from input data related to an input source. The flow begins and proceeds to 1910. At 1910, a haptic signal can be received. At 1920, a request can be received to adjust the playback rate of the haptic signal. At 1930, the number of samples to add or remove can be calculated to achieve the desired playback rate adjustment. In one embodiment, the number of samples can be based on the current haptic signal position or timestamp and a position or timestamp of a corresponding media element. For example, a media element can be at position 300, and a haptic signal can be at position 330. Therefore, it can be determined that 30 samples need to be removed from the haptic signal to bring it into approximate alignment with the media element.

In some embodiments where the haptic playback adjustment is based on a parameter, such as a finger movement parameter, the number of samples can be based on the parameter. For example, if a haptic playback speed is 500 Hz, the parameter can provide an instantaneous value that can cause an increase or decrease in the playback speed of the haptic signal by calculating the number of haptic samples to remove or add, respectively, based on the parameter.

In some embodiments, a memorized resampler can save a resample rate to use on future portions of the haptic signal. For example, it could be determined that about one sample for every ten samples needs to be removed from the haptic signal because it is playing faster than the media element playback. From the above example, the haptic signal playback position 330 can be seen as being 10% off from media element playback position 300 ((330−300)/300=10% off).

At 1940, at least a portion of the haptic signal can be converted into an adjusted haptic signal by resampling the portion of the haptic signal by adding or removing samples. Continuing the example, a portion of the haptic signal can be adjusted to remove 30 samples from the haptic signal. At 1950, the adjusted haptic signal can be send to a haptic output device to provide a haptic effect. In embodiments syncing to a media element, the resulting haptic effect can be in closer alignment to the media element than would have been played prior to adjustment.

Figure 20:
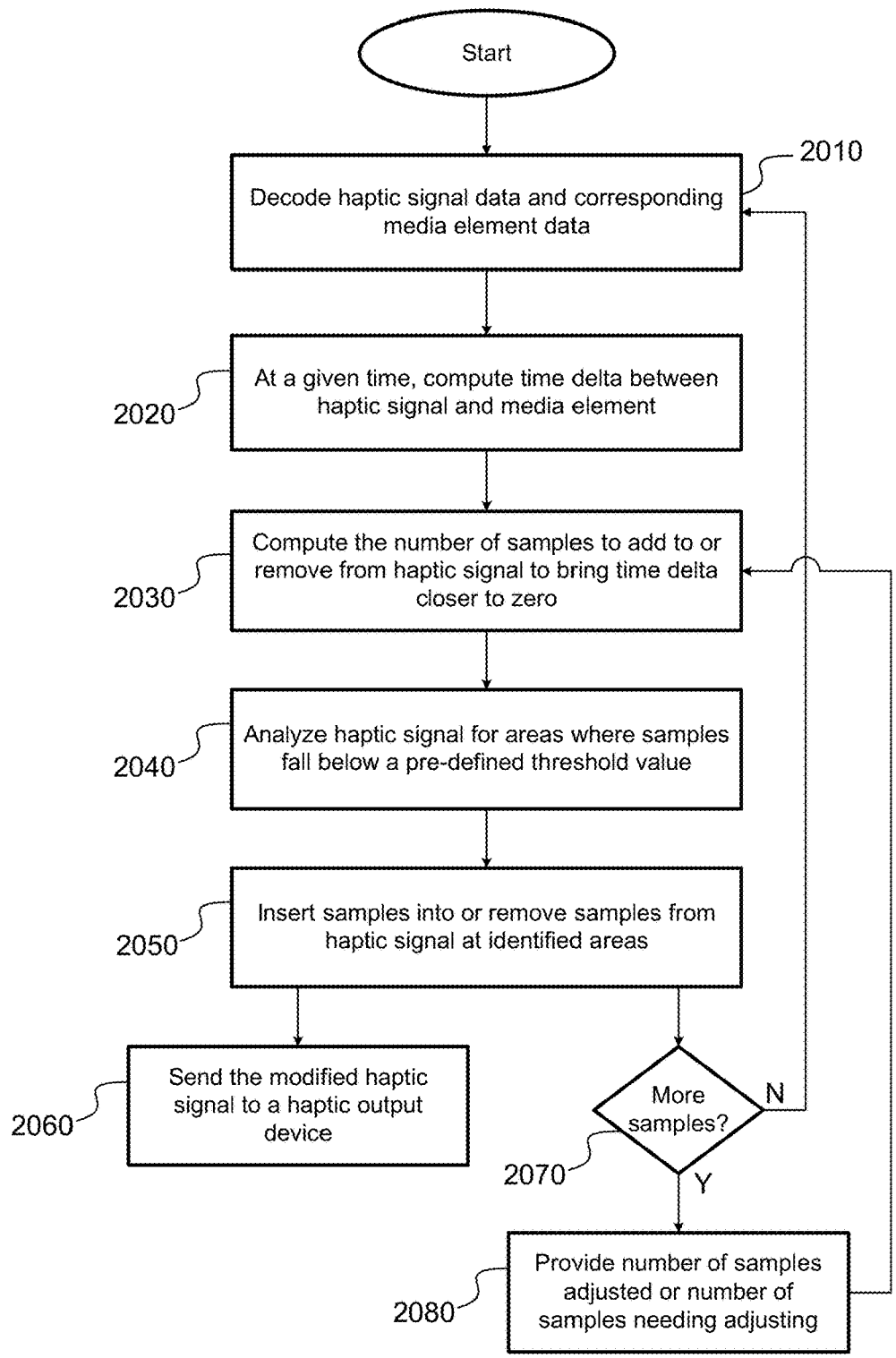
FIG. 20 illustrates a flow diagram of the functionality of a dynamic haptic playback adjustment module, according to an embodiment of the invention.

FIG. 20 illustrates a flow diagram of the functionality of a dynamic haptic playback adjustment module, according to an embodiment of the invention. FIG. 20 provides some specific embodiments for the flow of FIG. 19. The flow begins and proceeds to 2010. A haptic signal has already been received in accordance with 1910 of FIG. 19. At 2010 of FIG. 20, the haptic signal and (in applicable embodiments) corresponding media element data can be decoded for playback and playback can commence, the playback including playback of the haptic signal and in some embodiments the media element. At 2020, at a time after playback has begun, a time delta can be computed between the playback position of the haptic signal and the playback position of the media element. In embodiments where haptic playback rate is based on an input parameter, a time delta can be computed between a current playback rate and a desired playback rate. At 2030, the number of samples of the haptic signal can be computed to add to or remove from the haptic signal to bring the time delta closer to zero. For example, a time differential of 0.05 seconds between the haptic signal and the media element can result in a differential calculation of 400 samples if the haptic signal is being played at 8 kHz (8000 times 0.05). Thus, it can be determined that 400 samples must be added or removed from the haptic signal to bring the delta closer to zero.

In some embodiments, a memorized resampler can save a resample rate to use on future portions of the haptic signal. For example, it could be determined once that about 200 samples need to be inserted for a haptic block. The next haptic block can automatically be resampled to add 200 samples without initially requiring additional calculation. After resampling, the flow can go back to 2020 to analyze the resampled haptic signal as the applicable haptic signal to determine if a time delta still exists. Flow can continue from there and a newly calculated resample value can be used to update the previous memorized resampler by adjusting the value. For example, if 200 samples are inserted in a haptic block, then the block is reanalyzed for a time delta, and it is determined that 13 samples need to be removed, then the memorized value can be updated to be 200−13=187, for the next processed block.

At 2040, at least a portion of the haptic signal can be analyzed to find windows where samples fall below a given threshold value. These windows can represent areas or periods of the haptic signal where there is little to no haptic signal activity. Such windows can be considered periods of low entropy in the haptic signal. For example, a haptic signal containing sample values from 0 to 255 may have periods where each of the signal values is at or near 0. For example, it may be likely that in a given haptic signal, only a relatively small percentage of the signal contains haptic information above the threshold. The value of the threshold may be chosen so that a haptic signal with values at the threshold are unperceivable or barely perceivable to a typical human. The threshold helps identify windows of low entropy in the haptic signal which can be removed without adversely affecting portions of the haptic signal with haptic values above the threshold. At 2050, samples can be inserted into or removed from the haptic sample at the identified areas. For removing samples to shorten the haptic signal, samples falling below the threshold can be removed. In some embodiments, a length limit can specify that only a certain number or percentage of samples can be removed from one such haptic low entropy window. A length limit can help preserve the feel of the haptic signal (and in cases where the haptic signal is produced by a haptic designer, the intent of the designer), and help prevent a completely different haptic output from occurring. For example, it could be specified that no more than a third of the window's samples be removed at a time to help preserve some spatial information existing between times of haptic signal activity occurring above the threshold. To add samples to lengthen the haptic signal, zero value samples (or near zero value samples) can be inserted in the window. In some embodiments, a length limit can specify that only a certain number of samples can be added from one such identified area. For example, it could be specified that a window can grow by no more than a third. So, if the window contains 240 samples, no more than 80 samples could be inserted in that window.

At 2060, the modified haptic signal can be sent to the haptic output device. At 2070, if there are samples left over to further adjust the haptic signal, then at 2080, the number of adjusted samples can be provided and flow can continue back to 2030 to calculate the number of samples to add or removed from the haptic signal to bring the time delta closer to zero. For example, out of 400 samples to insert, if only 240 samples were inserted in the portion of the haptic signal analyzed, the remaining figure of 160 or the actively adjusted figure of 240 can be provided to update the number of samples left to adjust. If there are no more samples to insert or remove, flow can continue back to 2010 to decode more of the haptic signal data and corresponding media element data for playback. The flow can proceed to 2020 and so forth to further adjust the playback as needed until there is no more haptic signal left to process at 2010.

Figure 21:
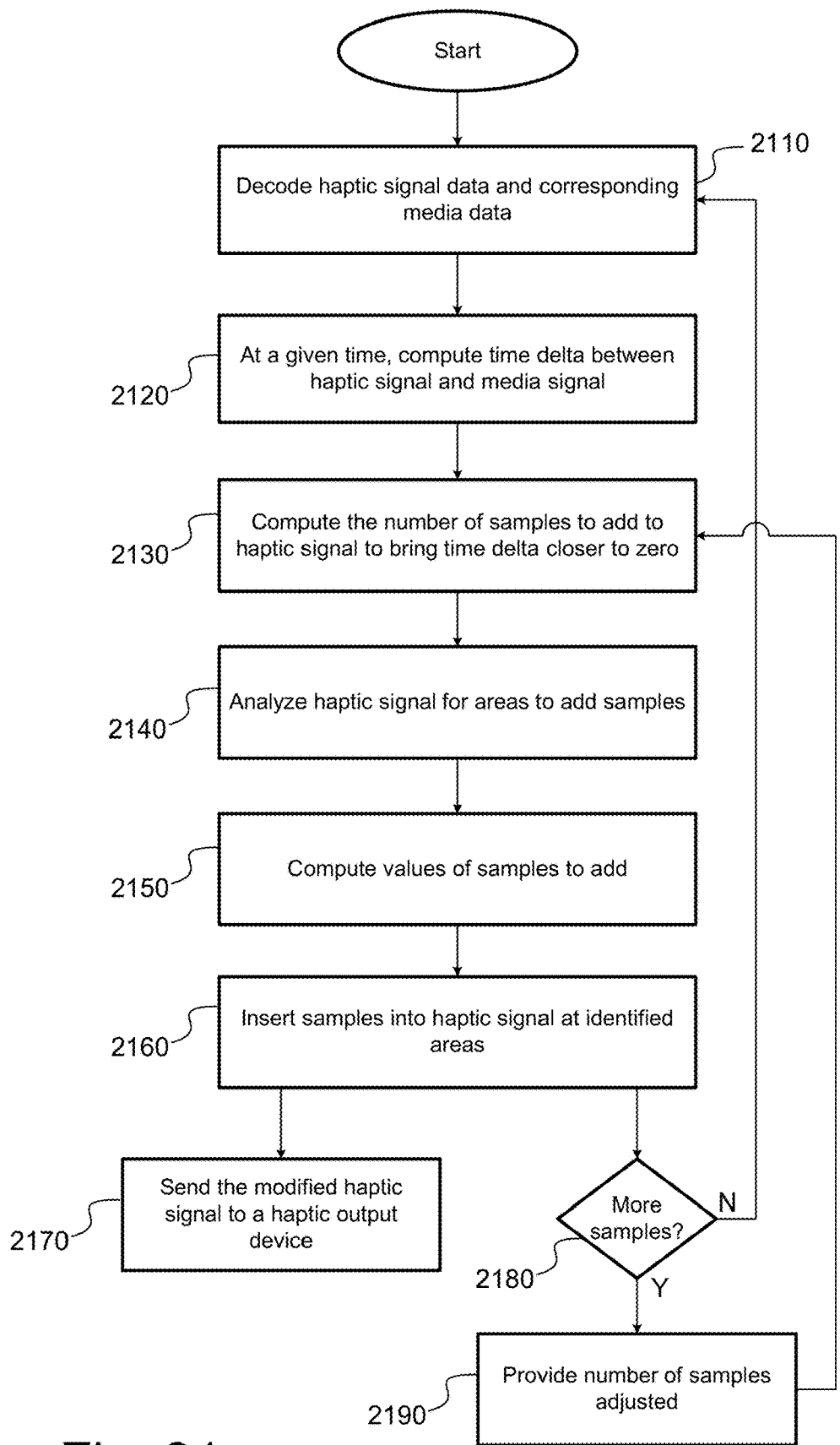
FIG. 21 illustrates a flow diagram of the functionality of a dynamic haptic playback adjustment module, according to an embodiment of the invention.

FIG. 21 illustrates a flow diagram of the functionality of a dynamic haptic playback adjustment module, according to an embodiment of the invention. FIG. 20 provides some specific embodiments for the flow of FIG. 19 only for the case of insertion of samples in certain cases. The flow begins and proceeds to 2110. A haptic signal has already been received in accordance with 1910 of FIG. 19. At 2110 of FIG. 21, the haptic signal data and (in applicable embodiments) corresponding media element data can be decoded for playback and playback can commence, the playback including playback of the haptic signal and, in some embodiments, the media element. At 2120, at a time after playback has begun, a time delta can be computed between the playback position of the haptic signal and the playback position of the media element. In embodiments where haptic playback rate is based on an input parameter, a time delta can be computed between a current playback rate and a desired playback rate. At 2130, a number of samples of the haptic signal can be computed to add to or remove from the haptic signal to bring the time delta closer to zero. If the case is to remove samples, then the flow can continue to 2040 of FIG. 20. If the case is to add samples, the flow can continue to 2140 of FIG. 21. For example, a time differential of 0.05 seconds between the haptic signal and the media element (showing that the haptic signal is behind the playback of the media element) can result in a differential calculation of 400 samples if the haptic signal is being played at 8 kHz (8000 times 0.05). Thus, it can be determined that 400 samples must be added to the haptic signal to bring the delta closer to zero.

In some embodiments, a memorized resampler can save a resample rate to use on future portions of the haptic signal. For example, it could be determined once that about 200 samples need to be inserted for a haptic block. The next haptic block can automatically be resampled to add 200 samples without initially requiring additional calculation. After resampling, the flow can go back to 2120 to analyze the resampled haptic signal as the applicable haptic signal to determine if a time delta still exists. Flow can continue from there and a newly calculated resample value can be used to update the previous memorized resampler by adjusting the value. For example, if 200 samples are inserted in a haptic block, then the block is reanalyzed for a time delta, and it is determined that 15 samples need to be added, then the memorized value can be updated to be 200+15=215, for the next processed block.

At 2140, the decoded portion of the haptic signal can be analyzed for areas to add samples. The samples to add can be distributed randomly or uniformly in the portion of the haptic signal. For example, if the haptic signal portion is 2000 samples and the adjustment is 400 samples, then 1 sample could be added after every 5 samples, to bring the total number of samples in an altered haptic signal to 2400 samples. At 2150, the value of each of the samples can be computed. Different methods can be used to calculate the value of each of the samples. For example, if a sample is to be inserted between original samples 20 and 21, the value of the inserted sample can be copied from sample 20, copied from sample 21, or can be the average of the two. In some embodiments, other adjacent samples can be analyzed to compute a value for the new sample. For example, samples 19 and 22 can also be analyzed to determine which value to put in the new sample. In other words, interpolation can be used to determine the value to insert into the new sample. At 2160, the new samples can be inserted into the haptic signal at the identified areas.

At 2170, the modified haptic signal can be sent to a haptic output device for playback. At 2180, if there are samples left over to further adjust the haptic signal, then at 2190, the number of adjusted samples can be provided and flow can continue back to 2130 to calculate the number of samples to add to the haptic signal to bring the time delta closer to zero. For example, out of 400 samples to insert, if only 240 samples were inserted in the portion of the haptic signal analyzed, the remaining figure of 160 or the actively adjusted figure of 240 can be provided to update the number of samples left to adjust. If there are no more samples to insert, flow can continue back to 2110 to decode more of the haptic signal data and corresponding media element data for playback. The flow can proceed to 2120 and so forth to further adjust the playback as needed until there is no more haptic signal left to process at 2110.

Figure 22:
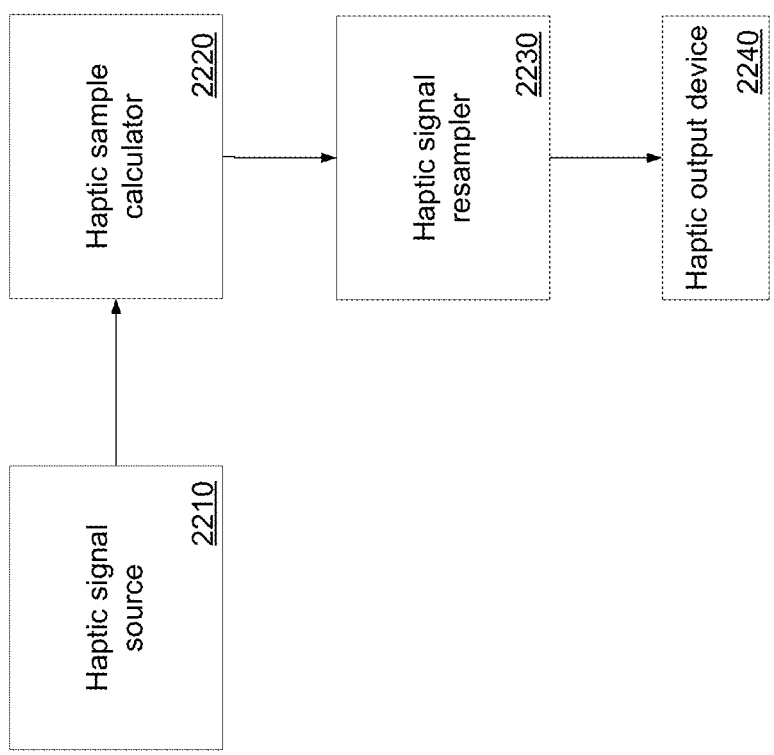
FIG. 22 illustrates a system for dynamic adjustment of a haptic signal by inserting into or removing samples from a haptic signal, in accordance with some embodiments.

FIG. 22 illustrates a system for dynamic adjustment of a haptic signal by inserting into or removing samples from a haptic signal, in accordance with one embodiment. A haptic signal source 2210 can provide a haptic signal to a haptic sample calculator 2220 for calculating the number of samples to add or remove from at least a portion of a haptic signal. The number of samples can be provided to a haptic signal resampler 2230, which can resample the haptic signal (or at least a portion thereof) using one of the methods previously discussed, such as inserting or removing samples. And, if inserting, inserting either zero samples (or low-value samples) or inserting distributed samples and choosing an appropriate value for the inserted sample based on the values of one or more of the samples around it. The resampled haptic signal can be sent to haptic output device 2240 for providing a haptic effect.

Thus, according to one embodiment, a haptic playback adjustment system can be provided that adjusts a playback of haptic data, such as a haptic signal, to correspond to a desired playback rate. Thus, the haptic playback adjustment system can accommodate scenarios where an adjusted playback of haptic data may be beneficial, such as: the synchronization of a playback of haptic data with a playback of some other type of data, such as audio data, video data, or acceleration data, where the other data can be output according to different playback rates; or a playback of haptic data at different devices with different hardware specifications, and thus, different playback capabilities.

One of skill in the art will understand that resampling can be accomplished using one or more of the above techniques, in combination together or in series, in any practical order.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to produce a haptic effect by performing instructions comprising:
    initiating playback of input data at a desired playback rate, the desired playback rate being different than an initial playback rate of the input data;
    generating a haptic signal by adjusting at least one of an original haptic signal for the input data or the input data based on the desired playback rate; and
    applying the haptic signal to a haptic output device to produce the haptic effect at the desired playback rate.

2. The non-transitory computer-readable medium of claim 1, wherein the input data is at least one of video data, audio data or sensor data.

3. The non-transitory computer-readable medium of claim 1, wherein the generating of the haptic signal comprises:
    dividing the original haptic signal into haptlets, each of the haptlets including an index indicating a position of a respective haptlet within the original haptic signal; and
    selecting at least one of the haptlets based on the playback of the input data at the desired playback rate to generate selected haptlets,
    the haptic signal being generated from the selected haptlets.

4. The non-transitory computer-readable medium of claim 1, further comprising instructions to playback the original haptic signal within a specified time range.

5. The non-transitory computer-readable medium of claim 1, wherein the generating of the haptic signal comprises:
    dividing the original haptic signal into haptic blocks; and
    implementing a delay for a specific duration between a first haptic block and a second haptic block based on the desired playback rate, the first haptic block and the second haptic block being consecutive haptic blocks,
    the haptic signal including the first haptic block, the second haptic block, and the delay between the first haptic block and the second haptic block.

6. The non-transitory computer-readable medium of claim 1, wherein the generating of the haptic signal includes resampling at least a portion of the original haptic signal into the haptic signal based on the playback of the input data at the desired playback rate.

7. The non-transitory computer-readable medium of claim 6, wherein the resampling of at least a portion of the original haptic signal includes either
    adding or removing silent haptic samples from the original haptic signal based on the desired playback rate, the silent haptic samples containing haptic data with a value below a threshold value;
    adding a haptic sample to the original haptic signal either before or after a nearest haptic sample based on the desired playback rate, the haptic sample having one or more values equal to that of the nearest haptic sample;
    adding the haptic sample to a selected location of the original haptic signal based on the desired playback rate, the haptic sample being based on an average of a first nearest haptic sample and a second nearest haptic sample; or
    dividing the original haptic signal into haptic blocks and resampling a first haptic block at a specified rate based on the desired playback rate.

8. A method of adjusting playback of a haptic effect, comprising:
    initiating playback of input data at a desired playback rate, the desired playback rate being different than an initial playback rate of the input data;
    generating a haptic signal by adjusting at least one of an original haptic signal for the input data or the input data based on the desired playback rate; and
    applying the haptic signal to a haptic output device to produce the haptic effect at the desired playback rate.

9. The method of claim 8, wherein the input data is at least one of video data, audio data or sensor data.

10. The method of claim 8, wherein the generating of the haptic signal comprises:
    dividing the original haptic signal into haptlets, each of the haptlets including an index indicating a position of a respective haptlet within the original haptic signal; and
    selecting at least one of the haptlets based on the playback of the input data at the desired playback rate to generate selected haptlets,
    the haptic signal being generated from the selected haptlets.

11. The method of claim 8, further comprising:
    playing back the original haptic signal within a specified time range.

12. The method of claim 8, wherein the generating of the haptic signal comprises:
    dividing the original haptic signal into haptic blocks; and
    implementing a delay for a specific duration between a first haptic block and a second haptic block based on the desired playback rate, the first haptic block and the second haptic block being consecutive haptic blocks,
    the haptic signal including the first haptic block, the second haptic block, and the delay between the first haptic block and the second haptic block.

13. The method of claim 8, wherein the generating of the haptic signal includes resampling at least a portion of the original haptic signal into the haptic signal based on the playback of the input data at the desired playback rate.

14. The method of claim 13, wherein the resampling of at least a portion of the original haptic signal includes either
    adding or removing silent haptic samples from the original haptic signal based on the desired playback rate, the silent haptic samples containing haptic data with a value below a threshold value;
    adding a haptic sample to the original haptic signal either before or after a nearest haptic sample based on the desired playback rate, the haptic sample having one or more values equal to that of the nearest haptic sample;
    adding the haptic sample to a selected location of the original haptic signal based on the desired playback rate, the haptic sample being based on an average of a first nearest haptic sample and a second nearest haptic sample; or
    dividing the original haptic signal into haptic blocks and resampling a first haptic block at a specified rate based on the desired playback rate.

15. A system for adjusting playback of a haptic effect, comprising:
    a device configured to initiate playback of input data at a desired playback rate, the desired playback rate being different than an initial playback rate of the input data;

a haptic signal generator configured to generate a haptic signal by adjusting at least one of an original haptic signal for the input data or the input data based on the desired playback rate; and a haptic output device configured to produce the haptic effect at the desired playback rate by applying the haptic signal.

16. The system of claim 15, wherein the input data is at least one of video data, audio data or sensor data.

17. The system of claim 15, wherein the haptic signal generator is configured to generate the haptic signal by:

dividing the original haptic signal into haptlets, each of the haptlets including an index indicating a position of a respective haptlet within the original haptic signal; and selecting at least one of the haptlets based on the playback of the input data at the desired playback rate to generate selected haptlets, the haptic signal being generated from the selected haptlets.

18. The system of claim 15, wherein the original haptic signal is played back within a specified time range.

19. The system of claim 15, wherein the haptic signal generator is configured to generate the haptic signal by:

dividing the original haptic signal into haptic blocks; and implementing a delay for a specific duration between a first haptic block and a second haptic block based on the desired playback rate, the first haptic block and the second haptic block being consecutive haptic blocks, the haptic signal including the first haptic block, the second haptic block, and the delay between the first haptic block and the second haptic block.

20. The system of claim 15, wherein the haptic signal generator is configured to generate the haptic signal by resampling a portion of the original haptic signal into the haptic signal based on the playback of the input data at the desired playback rate.

* * * * *